(12) United States Patent
Yeoh et al.

(10) Patent No.: US 10,901,223 B2
(45) Date of Patent: Jan. 26, 2021

(54) BEAM ANGLE SENSOR IN VIRTUAL/AUGMENTED REALITY SYSTEM

(71) Applicant: Magic Leap, Inc., Plantation, FL (US)

(72) Inventors: Ivan L. Yeoh, Tampa, FL (US); Lionel Ernest Edwin, Plantation, FL (US); Robert Dale Tekolste, Fort Lauderdale, FL (US)

(73) Assignee: Magic Leap, Inc., Plantation, FL (US)

(*) Notice: Subject to any disclaimer, the term of this patent is extended or adjusted under 35 U.S.C. 154(b) by 0 days.

(21) Appl. No.: 16/837,617

(22) Filed: Apr. 1, 2020

(65) Prior Publication Data

US 2020/0333602 A1 Oct. 22, 2020

Related U.S. Application Data

(63) Continuation of application No. 16/683,107, filed on Nov. 13, 2019, now Pat. No. 10,649,218, which is a
(Continued)

(51) Int. Cl.
*G02B 27/00* (2006.01)
*G02B 27/01* (2006.01)
(Continued)

(52) U.S. Cl.
CPC ........ *G02B 27/0172* (2013.01); *G01B 11/272* (2013.01); *G02B 6/0013* (2013.01);
(Continued)

(58) Field of Classification Search
None
See application file for complete search history.

(56) References Cited

U.S. PATENT DOCUMENTS 5,880,461 A 3/1999 Spear et al.
6,721,053 B1 * 4/2004 Maseeh .............. G01N 21/7746
356/436
(Continued)

FOREIGN PATENT DOCUMENTS

CN 101673159 3/2010
EP 1828832 5/2013
(Continued)

OTHER PUBLICATIONS

PCT International Search Report and Written Opinion for International Appln. No. PCT/US17/13234, Applicant Magic Leap, Inc., dated May 15, 2017 (12 pages).
(Continued)

*Primary Examiner* — Martin Mushambo
(74) *Attorney, Agent, or Firm* — Vista IP Law Group LLP

(57) ABSTRACT

A virtual image generation system for use by an end user comprises a projection subsystem configured for generating a collimated light beam, and a display configured emitting light rays in response to the collimated light beam to display a pixel of an image frame to the end user. The pixel has a location encoded with angles of the emitted light rays. The virtual image generation system further comprises a sensing assembly configured for sensing at least one parameter indicative of at least one of the emitted light ray angles, and a control subsystem configured for generating image data defining a location of the pixel, and controlling an angle of the light beam relative to the display based on the defined location of the pixel and the sensed parameter(s).

20 Claims, 22 Drawing Sheets

Related U.S. Application Data continuation of application No. 16/437,229, filed on Jun. 11, 2019, now Pat. No. 10,520,737, which is a continuation of application No. 16/030,713, filed on Jul. 9, 2018, now Pat. No. 10,359,634, which is a continuation of application No. 15/405,146, filed on Jan. 12, 2017, now Pat. No. 10,042,166.

(60) Provisional application No. 62/277,865, filed on Jan. 12, 2016.

(51) Int. Cl.
| | | |
|---|---|---|
| *G06F 3/01* | (2006.01) | |
| *G01B 11/27* | (2006.01) | |
| *F21V 8/00* | (2006.01) | |
| *G02B 26/10* | (2006.01) | |
| *G06F 3/00* | (2006.01) | |
| *G06T 15/50* | (2011.01) | |
| *G06T 19/00* | (2011.01) | |
| *G02B 6/34* | (2006.01) | |

(52) U.S. Cl.
CPC ......... *G02B 6/0016* (2013.01); *G02B 26/103* (2013.01); *G02B 27/0081* (2013.01); *G02B 27/0093* (2013.01); *G02B 27/0179* (2013.01); *G06F 3/002* (2013.01); *G06F 3/011* (2013.01); *G06F 3/012* (2013.01); *G06T 15/50* (2013.01); *G06T 19/006* (2013.01); *G02B 6/34* (2013.01); *G02B 2027/011* (2013.01); *G02B 2027/0125* (2013.01)

(56) References Cited

U.S. PATENT DOCUMENTS

| | | | |
|---|---|---|---|
| 9,423,397 B2* | 8/2016 | Duer | G01N 21/6454 |
| 10,042,166 B2 | 8/2018 | Yeoh et al. | |
| 10,359,634 B2 | 7/2019 | Yeoh et al. | |
| 2006/0038769 A1* | 2/2006 | Marra | G02F 1/133604 345/102 |
| 2010/0060612 A1* | 3/2010 | Jeon | G06F 3/0386 345/175 |
| 2010/0254019 A1* | 10/2010 | Cui | G01S 13/867 359/633 |
| 2010/0302196 A1* | 12/2010 | Han | G06F 3/0425 345/173 |
| 2013/0181896 A1* | 7/2013 | Gruhlke | G06F 3/0428 345/156 |
| 2013/0250430 A1* | 9/2013 | Robbins | G02B 27/0172 359/633 |
| 2014/0140091 A1 | 5/2014 | Vasylyev et al. | |
| 2014/0246612 A1* | 9/2014 | Spiecker | G01J 1/42 250/578.1 |
| 2015/0049122 A1* | 2/2015 | Buckley | G09G 3/3433 345/690 |
| 2015/0125109 A1* | 5/2015 | Robbins | G02B 27/0172 385/10 |
| 2015/0205031 A1* | 7/2015 | Van Herpen | G02B 6/0041 362/608 |
| 2015/0241619 A1 | 8/2015 | Richards et al. | |
| 2015/0346490 A1* | 12/2015 | Tekolste | G02B 27/0172 349/11 |
| 2016/0011112 A1* | 1/2016 | Tappura | G01N 21/6428 506/9 |
| 2016/0173777 A1* | 6/2016 | Campbell | H04N 5/247 348/222.1 |
| 2017/0052384 A1* | 2/2017 | Santori | G01N 21/05 |
| 2017/0184848 A1* | 6/2017 | Vallius | G02B 27/4205 |
| 2018/0095276 A1* | 4/2018 | Ng-Thow-Hing | G06F 3/0308 |
| 2019/0293941 A1 | 9/2019 | Yeoh et al. | |
| 2020/0081258 A1 | 3/2020 | Yeoh et al. | |

FOREIGN PATENT DOCUMENTS

| | | |
|---|---|---|
| JP | 2010-197864 | 9/2010 |
| JP | 2010-271554 | 12/2010 |
| JP | 2012-037761 | 2/2012 |
| WO | WO 2006/041452 | 4/2006 |

OTHER PUBLICATIONS

Extended European Search Report dated Jan. 3, 2019 for EP application No. 17738960.8, Applicant Magic Leap, Inc. 9 pages.
Response to Extended European Search Report dated Jul. 30, 2019, for European Patent Application No. 17738960.8, Applicant Magic Leap, Inc. (55 pages).
Notice of Allowance dated Aug. 14, 2019 for U.S. Appl. No. 16/437,229.
Notice of Allowance dated Jan. 2, 2020 for U.S. Appl. No. 16/683,107.
Foreign Office Action for JP Patent Appln. No. 2020-41077 dated Sep. 11, 2020.
Foreign OA for CN Patent Appln. No. 201780006347.9 dated Jul. 24, 2020.
Foreign Exam Report for AU Patent Appln. No. 2017207827 dated Oct. 22, 2020.

\* cited by examiner

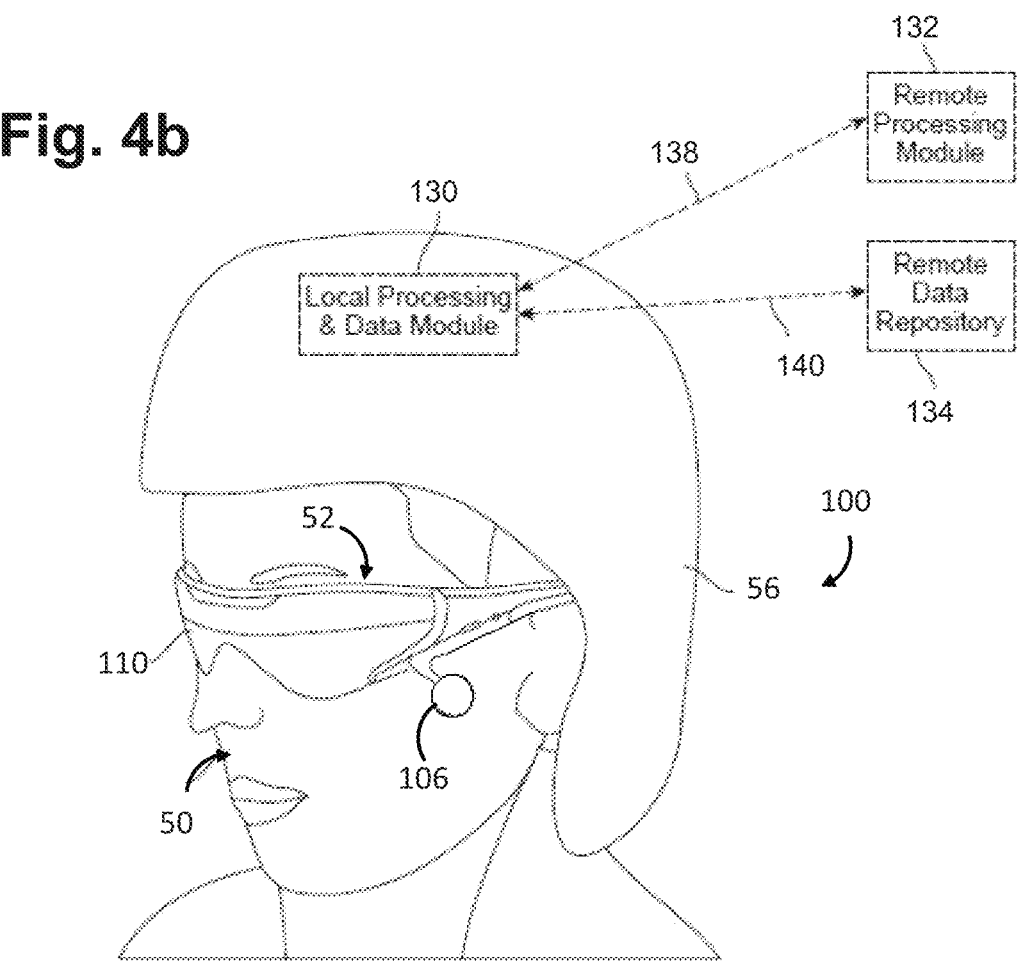

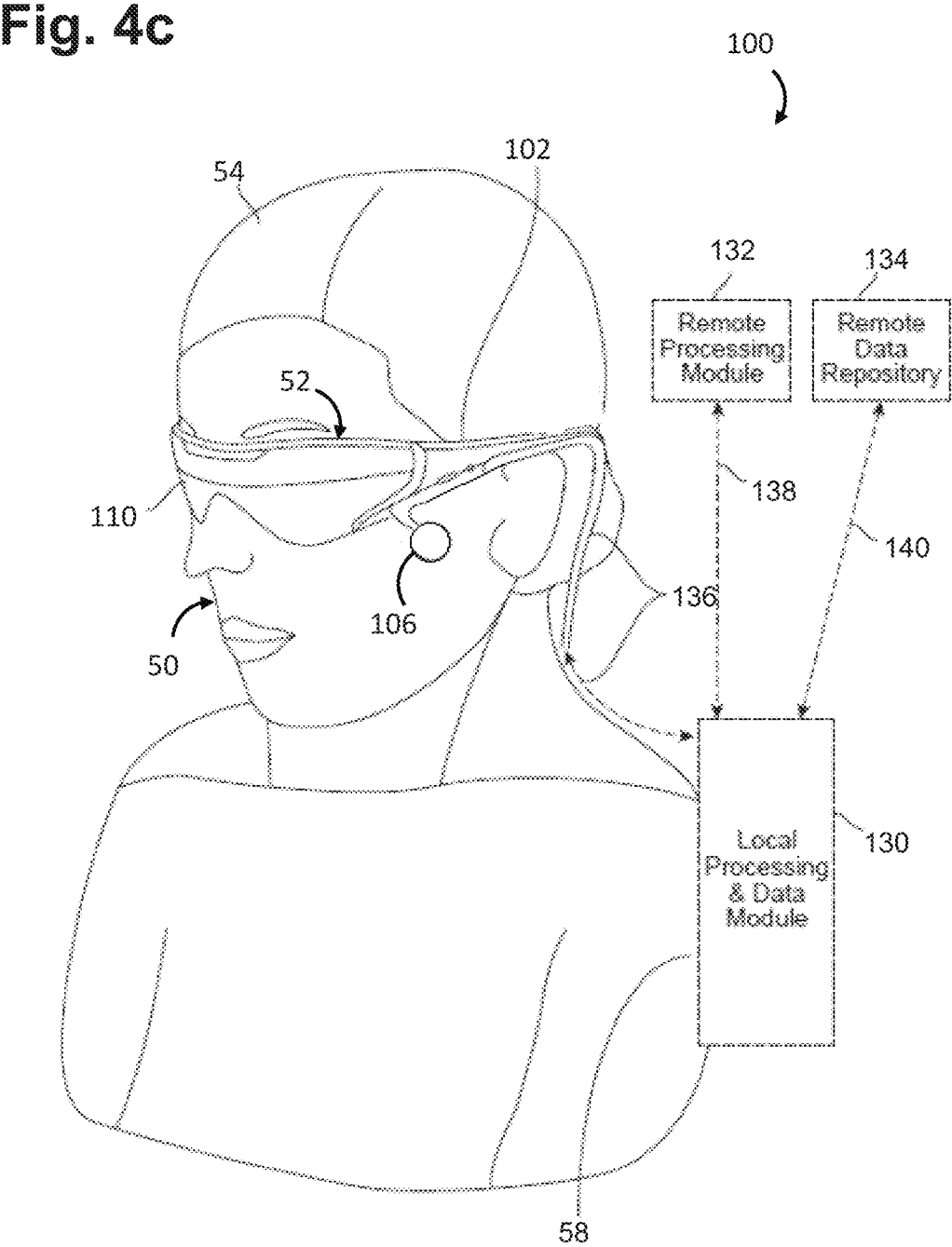

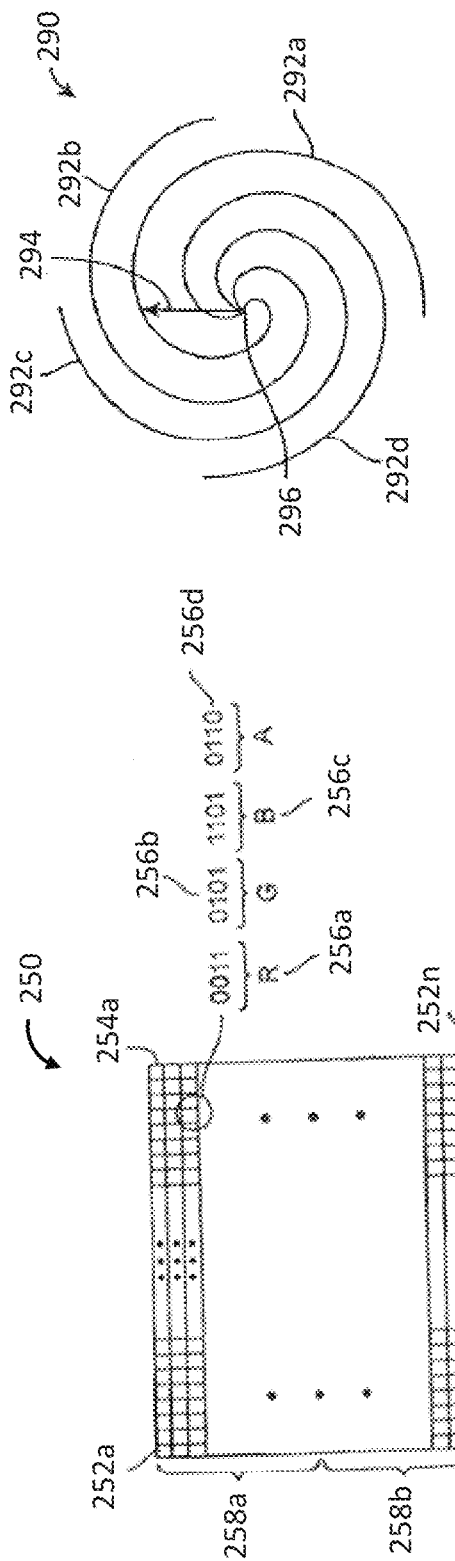
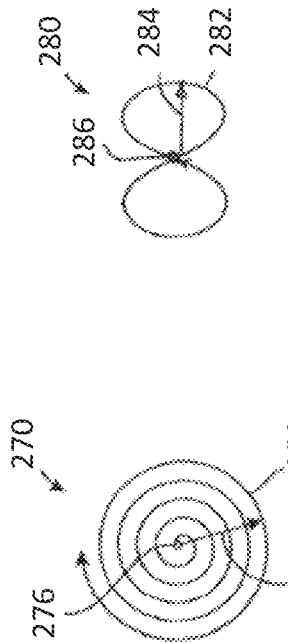
Fig. 7
Fig. 8
Fig. 9
Fig. 10
Fig. 11

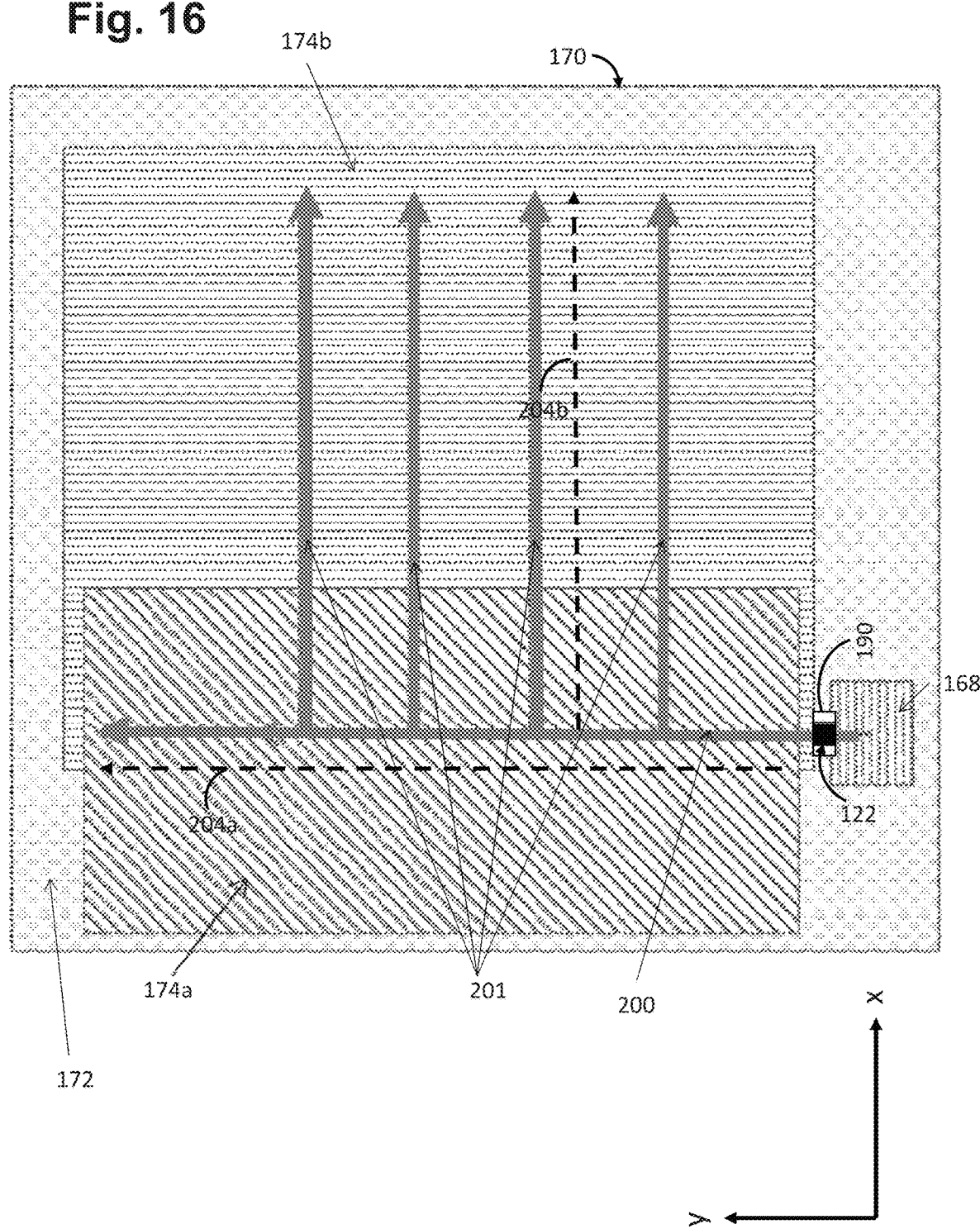

Fig. 19
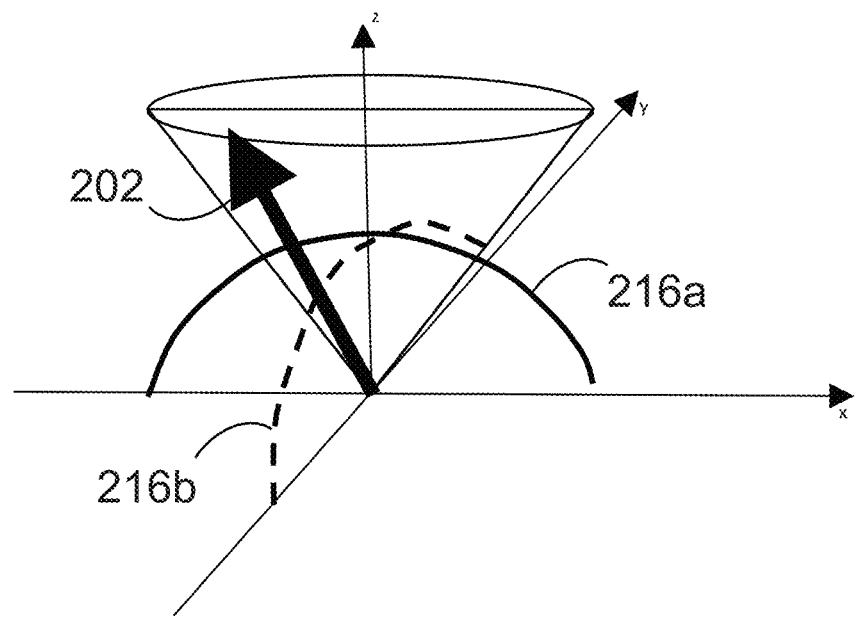
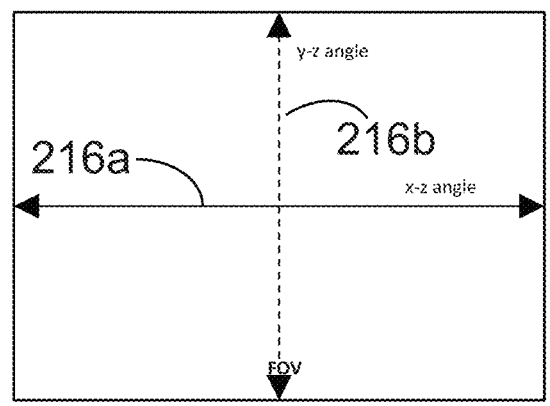

BEAM ANGLE SENSOR IN VIRTUAL/AUGMENTED REALITY SYSTEM

CROSS-REFERENCE TO RELATED APPLICATION(S)

This application is a continuation of U.S. patent application Ser. No. 16/683,107, entitled "BEAM ANGLE SENSOR IN VIRTUAL/AUGMENTED REALITY SYSTEM," filed Nov. 13, 2019, which is a continuation of U.S. patent application Ser. No. 16/437,229, entitled "BEAM ANGLE SENSOR IN VIRTUAL/AUGMENTED REALITY SYSTEM," filed Jun. 11, 2019, which is a continuation of U.S. patent application Ser. No. 16/030,713, entitled "BEAM ANGLE SENSOR IN VIRTUAL/AUGMENTED REALITY SYSTEM," filed Jul. 9, 2018, which is a continuation of U.S. patent application Ser. No. 15/405,146, entitled "BEAM ANGLE SENSOR IN VIRTUAL/AUGMENTED REALITY SYSTEM," filed Jan. 12, 2017, which claims priority from U.S. Provisional Patent Application Ser. No. 62/277,865 entitled "BEAM ANGLE SENSOR IN VIRTUAL/AUGMENTED REALITY SYSTEM," filed on Jan. 12, 2016. The content of the aforementioned patent applications are hereby expressly and fully incorporated by reference in their entirety, as though set forth in full.

FIELD OF THE INVENTION

The present invention generally relates to systems and methods configured to facilitate interactive virtual or augmented reality environments for one or more users.

BACKGROUND

Modern computing and display technologies have facilitated the development of systems for so-called "virtual reality" or "augmented reality" experiences, wherein digitally reproduced images or portions thereof are presented to a user in a manner where they seem to be, or may be perceived as, real. A virtual reality (VR) scenario typically involves presentation of digital or virtual image information without transparency to other actual real-world visual input, whereas an augmented reality (AR) scenario typically involves presentation of digital or virtual image information as an augmentation to visualization of the actual world around the end user.

For example, referring to FIG. 1, an augmented reality scene 4 is depicted wherein a user of an AR technology sees a real-world park-like setting 6 featuring people, trees, buildings in the background, and a concrete platform 8. In addition to these items, the end user of the AR technology also perceives that he "sees" a robot statue 10 standing upon the real-world platform 8, and a cartoon-like avatar character 12 flying by which seems to be a personification of a bumble bee, even though these elements 10, 12 do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

VR and AR systems typically employ head-worn displays (or helmet-mounted displays, or smart glasses) that are at least loosely coupled to a user's head, and thus move when the end user's head moves. If the end user's head motions are detected by the display subsystem, the data being displayed can be updated to take the change in head pose (i.e., the orientation and/or location of user's head) into account.

As an example, if a user wearing a head-worn display views a virtual representation of a three-dimensional (3D) object on the display and walks around the area where the 3D object appears, that 3D object can be re-rendered for each viewpoint, giving the end user the perception that he or she is walking around an object that occupies real space. If the head-worn display is used to present multiple objects within a virtual space (for instance, a rich virtual world), measurements of head pose can be used to re-render the scene to match the end user's dynamically changing head location and orientation and provide an increased sense of immersion in the virtual space.

Head-worn displays that enable AR (i.e., the concurrent viewing of real and virtual elements) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the end user can see through transparent (or semi-transparent) elements in the display subsystem to view directly the light from real objects in the environment. The transparent element, often referred to as a "combiner," superimposes light from the display over the end user's view of the real world.

VR and AR systems typically employ a display subsystem having a projection subsystem and a display surface positioned in front of the end user's field of view and on which the projection subsystem sequentially projects image frames. In true three-dimensional systems, the depth of the display surface can be controlled at frame rates or sub-frame rates. The projection subsystem may include one or more optical fibers into which light from one or more light sources emit light of different colors in defined patterns, and a scanning device that scans the optical fiber(s) in a predetermined pattern to create the image frames that sequentially displayed to the end user.

In one embodiment, the display subsystem includes one or more planar optical waveguides that are generally parallel to the field of view of the user, and into which light from the optical fiber(s) is injected. One or more linear diffraction gratings are embedded within the waveguide(s) to change the angle of incident light propagating along the waveguide(s). By changing the angle of light beyond the threshold of total internal reflection (TIR), the light escapes from one or more lateral faces of the waveguide(s). The linear diffraction grating(s) have a low diffraction efficiency, so only a fraction of the light energy is directed out of the waveguide(s), each time the light encounters the linear diffraction grating(s). By outcoupling the light at multiple locations along the grating(s), the exit pupil of the display subsystem is effectively increased. The display subsystem may further comprise one or more collimation elements that collimate light coming from the optical fiber(s), and an optical input apparatus that optically couples the collimated light to, or from, an edge of the waveguide(s).

With reference to FIG. 2, one embodiment of a display subsystem 20 comprises one or more light sources 22 that generates light, an optical fiber 24 that emits the light, and a collimation element 26 that collimates the light exiting the distal end of the optical fiber 24 into a light beam 36. The display subsystem 20 further comprises a piezoelectric element 28 to or in which the optical fiber 24 is mounted as a fixed-free flexible cantilever, and drive electronics 30 electrically coupled to the piezoelectric element 22 to activate electrically stimulate the piezoelectric element 28, thereby causing the distal end of the optical fiber 24 to vibrate in a pre-determined scan pattern that creates deflections 32 about a fulcrum 34, thereby scanning the collimated light beam 36 in accordance with the scan pattern.

The display subsystem 20 comprises a waveguide apparatus 38 that includes a planar optical waveguide 40 that is generally parallel to the field-of-view of the end user, a diffractive optical element (DOE) 42 associated with the planar optical waveguides 40, and in-coupling element (ICE) 42 (which take the form of a DOE) integrated within the end of the planar optical waveguide 40. The ICE 42 in-couples and redirects the collimated light 36 from the collimation element 26 into the planar optical waveguide 40. The collimated light beam 36 from the collimation element 26 propagates along the planar optical waveguide 40 and intersects with the DOE 42, causing a portion of the light to exit the face of the waveguide apparatus 38 as light rays 46 towards the eyes of the end user that are focused at a viewing distance depending on the lensing factor of the planar optical waveguide 40. Thus, the light source(s) 22 in conjunction with the drive electronics 30 generate image data encoded in the form of light that is spatially and/or temporally varying.

The location of each pixel visualized by the end user is highly dependent on the angle of the light rays 48 that exit the planar optical waveguide 40. Thus, light rays 48 that exit the waveguide 40 at different angles will create pixels at different locations in the field of view of the end user. For example, if it is desired to locate a pixel at the top right of the field of view of the end user, a collimated light beam 36 may be input into the waveguide apparatus 38 at one angle, and if is desired to locate a pixel at the center of the field of view of the end user, the collimated light beam 36 may be input into the waveguide apparatus 38 at a second different angle. Thus, as the optical fiber 24 is being scanned in accordance with a scan pattern, the light beam 36 originating from the optical fiber 24 will be input into the waveguide apparatus 38 at different angles, thereby creating pixels at different locations in the field of view of the end user. Thus, the location of each pixel in the field of view of the end user is highly dependent on the angle of the light rays 48 exiting the planar optical waveguide 40, and thus, the locations of these pixels are encoded within the image data generated by the display subsystem 20.

Although the angle of the light beam 36 entering the waveguide apparatus 38, and thus, the angle of the light beam 36 entering the planar optical waveguide 40 will differ from the angles of the light rays 48 exiting the planar optical waveguide 40, the relationships between the angle of the light beam 36 entering the waveguide apparatus 38 and the angles of the light rays 48 exiting the planar optical waveguide 40 is well-known and predictable, and thus, the angles of the light rays 48 exiting the planar optical waveguide 40 can be easily predicted from the angle of the collimated light beam 36 entering the waveguide apparatus 38.

It can be appreciated from the foregoing that the actual angles of the light beams 36 entering the waveguide apparatus 38 from the optical fiber 24, and thus, the actual angles of the light rays 48 exiting the waveguide 40 towards the end user be identical or near identical or one-to-one in relationship to the designed angles of the exiting light rays 48, such that the locations of the pixels visualized by the end user are properly encoded in the image data generated by the display subsystem 20. However, due to manufacturing tolerances between different scanners, as well, as changing environmental conditions, such as variations in temperature that may change the consistency of bonding materials used to integrate the display subsystem 20 together, the actual angles of the exiting light rays 48, without compensation, will vary from the designed angles of the exiting light rays 48, thereby creating pixels that are in the incorrect locations within the field of view of the end user, resulting in image distortion.

There, thus, is a need to ensure that the actual angles of light rays exiting the waveguide of a display subsystem in a virtual reality or augmented reality environment are as close to identical to the designed angles encoded within the image data generated by the display subsystem.

SUMMARY

Embodiments of the present invention are directed to devices, systems and methods for facilitating virtual reality and/or augmented reality interaction for one or more users.

In accordance with a first aspect of the present invention, a display subsystem for a virtual image generation system used by an end user is provided. The display subsystem comprises a waveguide apparatus. In one embodiment, the waveguide apparatus is configured for being positioned in front of the eyes of the end user. In another embodiment, the waveguide apparatus has a partially transparent display surface configured for being positioned in the field of view between the eyes of the end user and an ambient environment. In still another embodiment, the display subsystem comprises a frame structure configured for being worn by the end user. In this case, the frame structure carries the waveguide apparatus.

The display subsystem further comprises an imaging element configured for emitting light, and a collimation element configured for collimating the light from the imaging element into a light beam. In one embodiment, the imaging element comprises at least one light source configured for generating the light, an optical fiber configured for emitting the light, and a mechanical drive assembly to which the optical fiber is mounted. The mechanical drive assembly is configured for displacing the optical fiber in accordance with a scan pattern. In one embodiment, the mechanical drive assembly comprises a piezoelectric element to which the optical fiber is mounted, and drive electronics configured for conveying electrical signals to the piezoelectric element, thereby causing the optical fiber to vibrate in accordance with the scan pattern.

The display subsystem further comprises an in-coupling element (ICE) configured for directing the light beam from the collimation element down the waveguide apparatus, such that light rays exit the waveguide apparatus to display a pixel of an image frame to the end user. The pixel has a location encoded with angles of the exiting light rays. In one embodiment, the waveguide apparatus comprises a planar optical waveguide (e.g., one formed of a single pan of optically transparent material), in which case, the ICE is configured for optically coupling the collimated light beam from the imaging element into the planar optical waveguide as an in-coupled light beam. The waveguide apparatus may further comprise an orthogonal pupil expansion (OPE) element associated with the planar optical waveguide for splitting the in-coupled light beam into a plurality of orthogonal light beams, and an exit pupil expansion (EPE) element associated with the planar optical waveguide for splitting the plurality of orthogonal light beams into the light rays that exit the planar optical waveguide.

The display subsystem further comprises a sensing assembly configured for sensing at least one parameter indicative of at least one of the exiting light ray angles. In one embodiment, the sensed parameter(s) are indicative of the exiting light ray angle(s) projected in at least one plane (e.g., two orthogonal planes that are orthogonal to each other) that is orthogonal to a plane coincident with the exterior surface of the waveguide apparatus.

In another embodiment, the sensed parameter(s) comprises an intensity of at least one light ray representative of the plurality of exiting light rays. The representative light ray(s) may be different from the plurality of exiting light rays. In this case, the representative light ray(s) may exit the waveguide apparatus at a different location from the plurality of exiting light rays outside of the field of view of the end user. Alternatively, the plurality of exiting light rays may comprise the representative light ray(s).

In any event, the sensing assembly may comprise at least one angle sensor, each of which includes a photo-intensity sensor and an angle selective layer mounted between the waveguide apparatus and the photo-intensity sensor. In one embodiment, the angle sensor(s) comprise a pair of orthogonal sensors respectively configured for sensing first and second orthogonal intensity components of the representative light ray(s). The pair of orthogonal sensors may respectively comprise first and second cylindrical lenses configured for respectively passing the first and second orthogonal intensity components of the representative light ray(s). Or, the pair of orthogonal sensors respectively may comprise first and second diffractive optical elements configured for respectively passing the first and second orthogonal intensity components of the representative light ray(s). Or, the pair of orthogonal sensors may respectively comprise first and second polarization elements configured for respectively polarizing each of the representative light ray(s) into orthogonally polarized light rays. Or, the angle selective layers may be strained in orthogonal orientations.

In still another embodiment, the sensed parameter(s) may comprise an absolute intensity of the at least one representative light ray, such that the first and second orthogonal intensity components can be normalized. In this case, the sensing assembly may comprise another photo-intensity sensor configured for measuring the absolute intensity of the at least one representative light ray. In yet another embodiment, the sensed parameter(s) is indicative of relative angles of the plurality of exiting light rays. For example, the sensed parameter(s) may comprise a quadrant in which the collimated light beam is projected in a plane. In this case, the sensing assembly may comprise a plurality of sensors spaced apart in the quadrants of a reference plane or a quadrant position sensing detector (PSD).

In accordance with a second aspect of the present inventions, a virtual image generation system comprises the afore-described display subsystem, and a control subsystem configured for generating image data defining a location of the pixel, and controlling an angle of the light beam relative to the ICE based on the defined location of the pixel and the sensed parameter(s). The virtual image generation system may further comprise memory storing a three-dimensional scene, in which case, the control subsystem may be configured for rendering a plurality of synthetic image frames of the three-dimensional scene, and the display subsystem may be configured for sequentially displaying the plurality of image frames to the end user. The control subsystem may comprise a graphics processing unit (GPU).

In accordance with a third aspect of the present inventions, a virtual image generation system for use by an end user is provided. The virtual image generation system comprises a projection subsystem configured for generating a collimated light beam. In one embodiment, the projection subsystem comprises at least one light source configured for generating light, an optical fiber configured for emitting the light, a collimation element configured for collimating the light from the optical fiber into the collimated light beam, and a mechanical drive assembly to which the optical fiber is mounted. The mechanical drive assembly is configured for displacing the optical fiber in accordance with a scan pattern. In one embodiment, the mechanical drive assembly may comprise a piezoelectric element to which the optical fiber is mounted, and drive electronics configured for conveying electrical signals to the piezoelectric element, thereby causing the optical fiber to vibrate in accordance with the scan pattern.

The virtual image generation system further comprises a display configured emitting light rays in response to the collimated light beam to display a pixel of an image frame to the end user. The pixel has a location encoded with angles of the emitted light rays. In one embodiment, the display is configured for displaying the pixel of the image frame selectively at one of a plurality of different focal points to the end user. The display may be configured for being positioned in front of the eyes of the end user. The display may have a partially transparent display surface configured for being positioned in the field of view between the eyes of the end user and an ambient environment. In another embodiment, the virtual image generation system further comprises a frame structure configured for being worn by the end user, the frame structure carrying the display.

The virtual image generation system further comprises a sensing assembly configured for sensing at least one parameter indicative of the emitted light ray angle(s). In one embodiment, the parameter(s) sensed by the sensing assembly is indicative of the exiting light ray angle(s) projected in at least one plane (e.g., two orthogonal planes that are orthogonal to each other) that is orthogonal to a plane coincides with the exterior surface of the waveguide apparatus.

In another embodiment, the sensed parameter(s) are indicative of the emitted light ray angle(s) projected in at least one plane (e.g., two orthogonal planes that are orthogonal to each other) that is orthogonal to a plane coincident with the exterior surface of the waveguide apparatus.

In still another embodiment, the sensed parameter(s) comprises an intensity of at least one light ray representative of the plurality of emitted light rays. The representative light ray(s) may be different from the plurality of emitted light rays. In this case, the representative light ray(s) may exit the waveguide apparatus at a different location from the plurality of emitted light rays outside of the field of view of the end user. Alternatively, the plurality of emitted light rays may comprise the representative light ray(s).

In any event, the sensing assembly may comprise at least one angle sensor, each of which includes a photo-intensity sensor and an angle selective layer mounted between the waveguide apparatus and the photo-intensity sensor. In one embodiment, the angle sensor(s) comprise a pair of orthogonal sensors respectively configured for sensing first and second orthogonal intensity components of the representative light ray(s). The pair of orthogonal sensors may respectively comprise first and second cylindrical lenses configured for respectively passing the first and second orthogonal intensity components of the representative light ray(s). Or, the pair of orthogonal sensors respectively may comprise first and second diffractive optical elements configured for respectively passing the first and second orthogonal intensity components of the representative light ray(s). Or, the pair of orthogonal sensors may respectively comprise first and second polarization elements configured for respectively polarizing each of the representative light ray(s) into orthogonally polarized light rays. Or, the angle selective layers may be strained in orthogonal orientations.

In yet another embodiment, the sensed parameter(s) may comprise an absolute intensity of the at least one representative light ray, such that the first and second orthogonal intensity components can be normalized. In this case, the sensing assembly may comprise another photo-intensity sensor configured for measuring the absolute intensity of the at least one representative light ray. In yet another embodiment, the sensed parameter(s) is indicative of relative angles of the plurality of emitted light rays. For example, the sensed parameter(s) may comprise a quadrant in which the collimated light beam is projected in a plane. In this case, the sensing assembly may comprise a plurality of sensors spaced apart in the quadrants of a reference plane or a quadrant position sensing detector (PSD).

The virtual image generation system further comprises a control subsystem configured for generating image data defining a location of the pixel, and controlling an angle of the light beam relative to the display based on the defined location of the pixel and the sensed parameter(s). The virtual image generation system may further comprise memory storing a three-dimensional scene, in which case, the control subsystem may be configured for rendering a plurality of synthetic image frames of the three-dimensional scene, and the display may be configured for sequentially displaying the plurality of image frames to the end user. The control subsystem may comprise a graphics processing unit (GPU).

Additional and other objects, features, and advantages of the invention are described in the detail description, figures and claims.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings.

Understanding that these drawings depict only typical embodiments of the invention and are not therefore to be considered limiting of its scope, the invention will be described and explained with additional specificity and detail through the use of the accompanying drawings in which:

FIG. 4b is a plan view of another technique that can be used to wear the virtual image generation system of FIG. 3;

FIG. 4c is a plan view of still another technique that can be used to wear the virtual image generation system of FIG. 3;

FIG. 7 is a plan view of an exemplary frame generated by the virtual image generation system of FIG. 3;

FIG. 8 is a plan view of one scanning pattern that can be used to generate the exemplary frame of FIG. 7;

FIG. 9 is a plan view of another scanning pattern that can be used to generate another exemplary frame;

FIG. 10 is a plan view of still another scanning pattern that can be used to generate still another exemplary frame;

FIG. 11 is a plan view of yet another scanning pattern that can be used to generate yet another exemplary frame;

FIG. 16 is a plan view of still another embodiment of a waveguide apparatus for use in the display subsystem of FIG. 5;

FIG. 19 is a perspective view of the projection of the angle of a light ray exiting the display screen of FIG. 18a, projected onto an x-z plane and a y-z plane;

DETAILED DESCRIPTION

The description that follows relates to display subsystems and methods to be used in virtual reality and/or augmented reality systems. However, it is to be understood that the while the invention lends itself well to applications in virtual or augmented reality systems, the invention, in its broadest aspects, may not be so limited.

Figure 1:
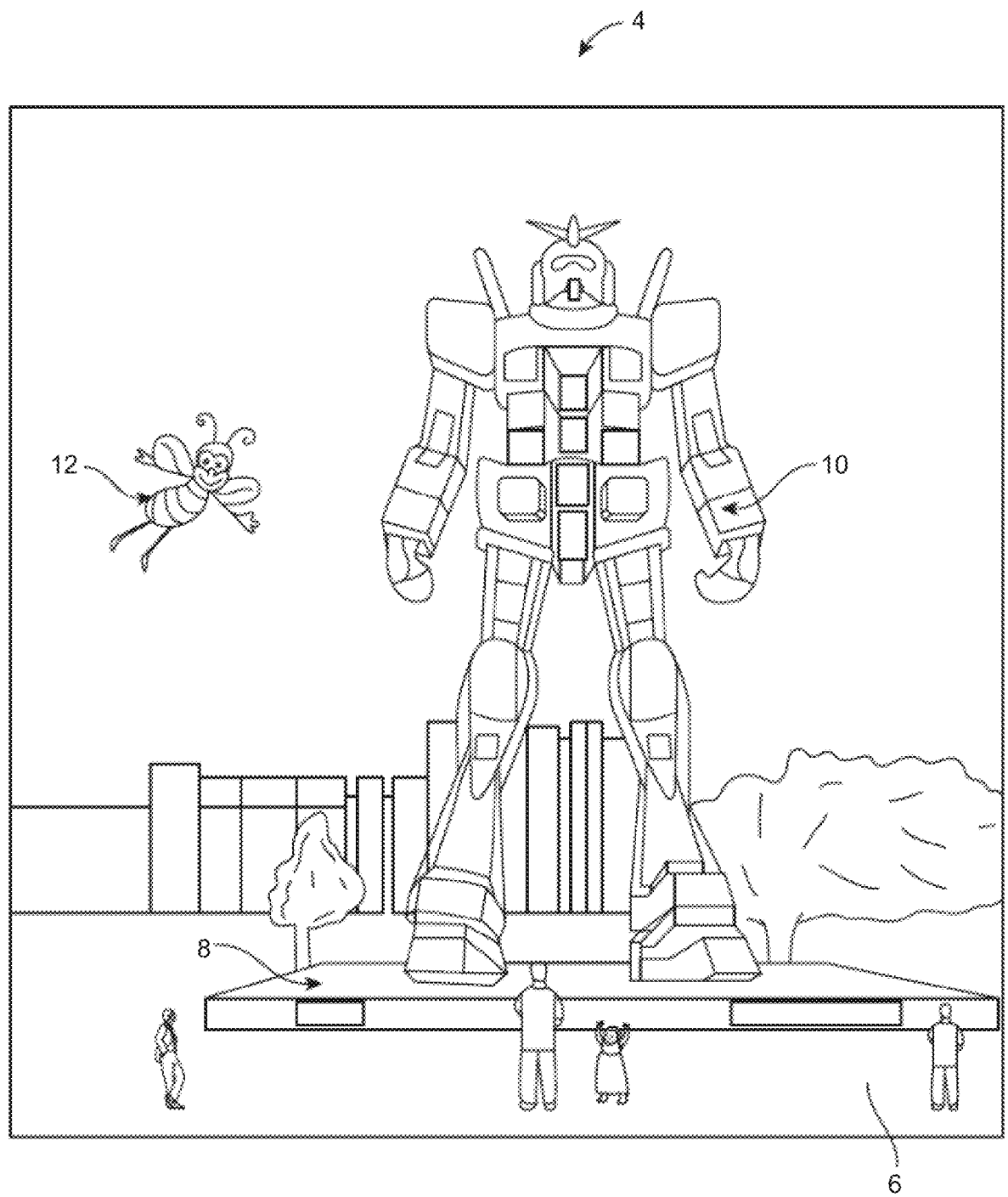
FIG. 1 is a picture of a three-dimensional augmented reality scene that can be displayed to an end user by a prior art augmented reality generation device.
Figure 2:
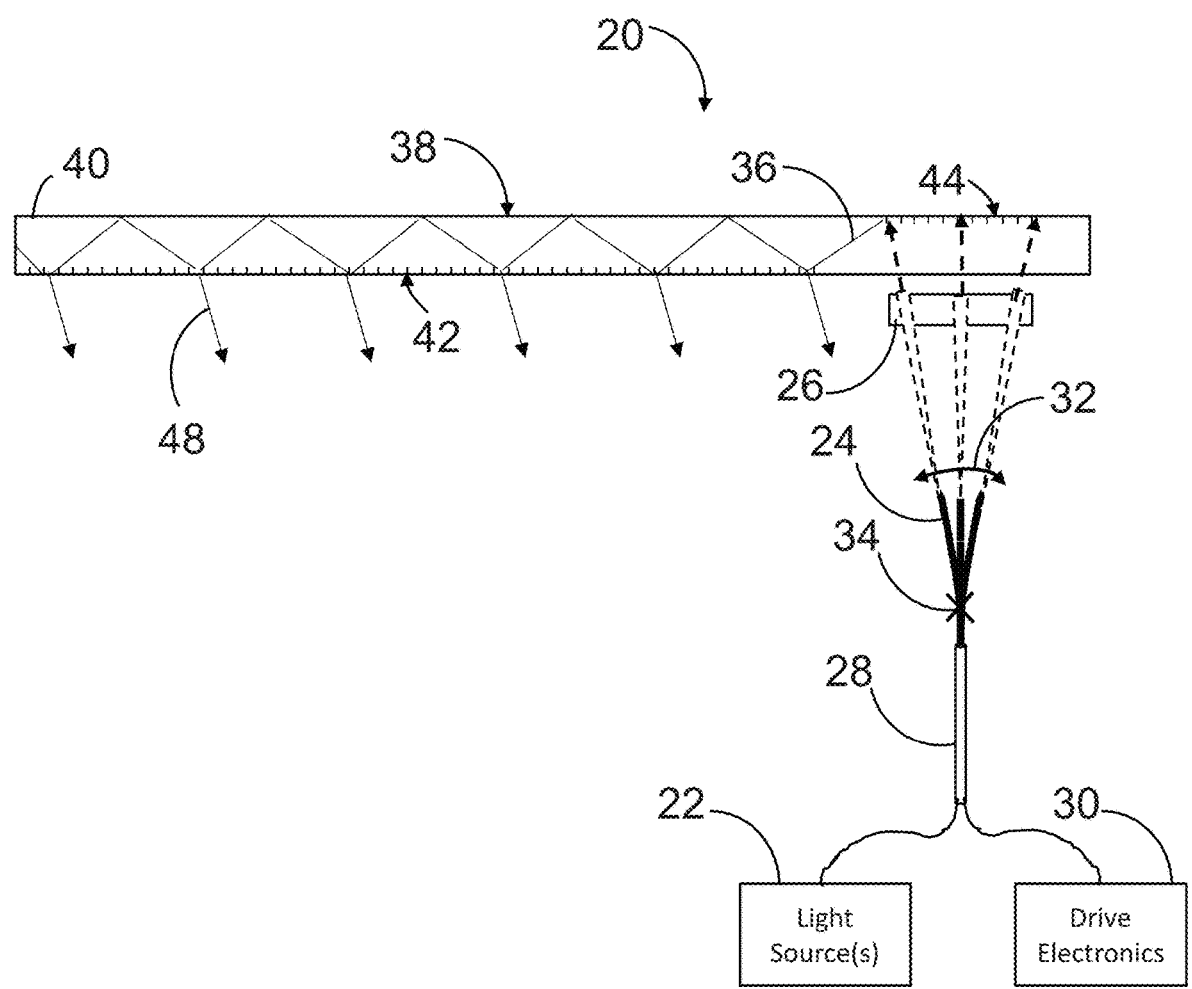
FIG. 2 is a plan view of one embodiment of a prior art display subsystem that can be used in an augmented reality generation device.
Figure 3:
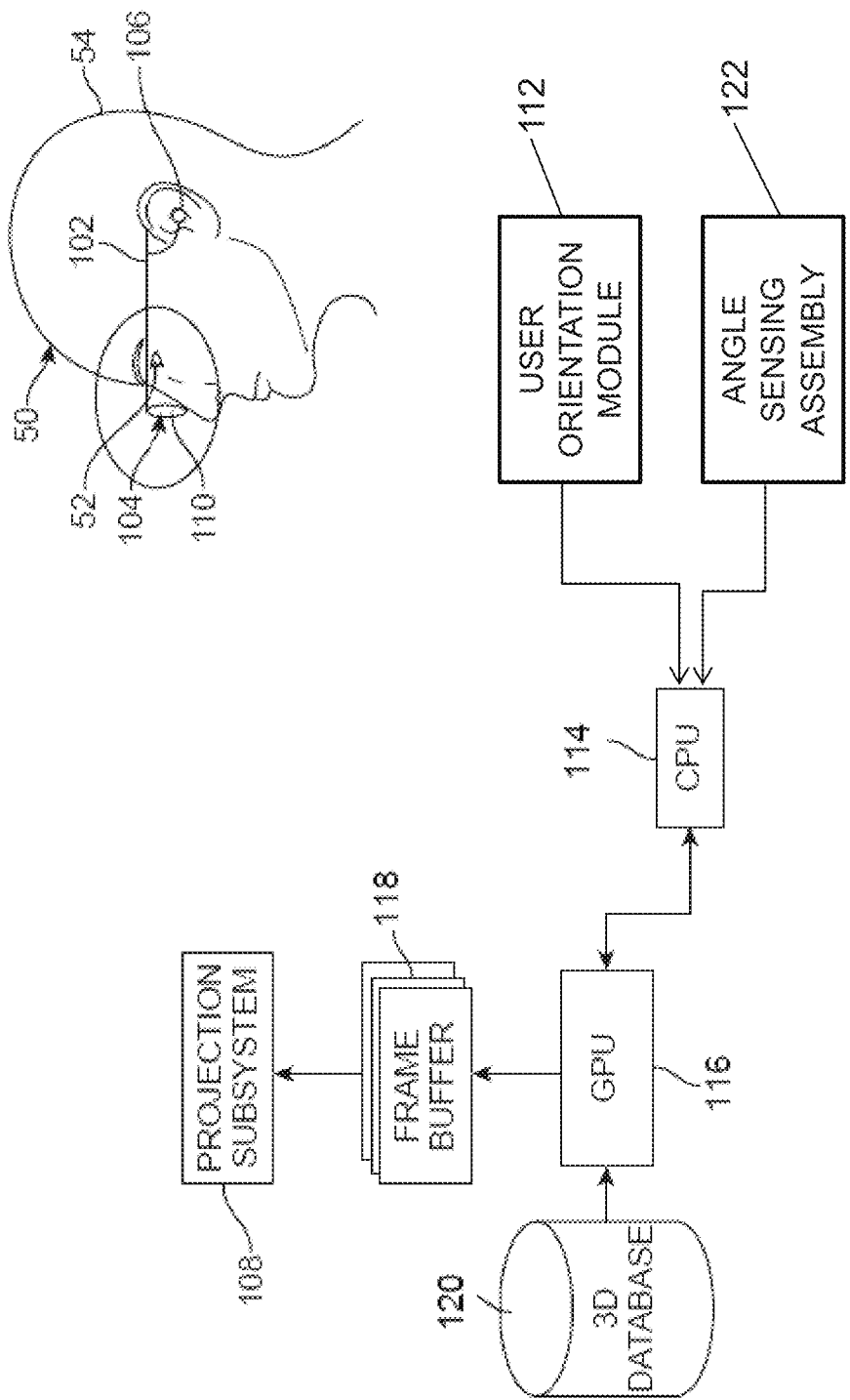
FIG. 3 is a block diagram of a virtual image generation system constructed in accordance with one embodiment of the present inventions.

Referring to FIG. 3, one embodiment of a virtual image generation system 100 constructed in accordance with present inventions will now be described. The virtual image generation system 100 may be operated as an augmented reality subsystem, providing images of virtual objects inter-mixed with physical objects in a field of view of an end user 50. There are two fundamental approaches when operating the virtual image generation system 100. A first approach employs one or more imagers (e.g., cameras) to capture images of the ambient environment. The virtual image generation system 100 inter-mixes the virtual images into the data representing the images of the ambient environment. A second approach employs one or more at least partially transparent surfaces through which the ambient environment can be seen and onto which the virtual image generation system 100 produces images of virtual objects.

The virtual image generation system 100, and the various techniques taught herein, may be employed in applications other than augmented reality and virtual reality subsystems. For example, various techniques may be applied to any projection or display subsystem, or may be applied to pico projectors where movement may be made by an end user's hand rather than the head. Thus, while often described herein in terms of an augmented reality subsystem or virtual reality subsystem, the teachings should not be limited to such subsystems of such uses.

At least for augmented reality applications, it may be desirable to spatially position various virtual objects relative to respective physical objects in a field of view of the end user 50. Virtual objects, also referred to herein as virtual tags or tag or call outs, may take any of a large variety of forms, basically any variety of data, information, concept, or logical construct capable of being represented as an image. Non-limiting examples of virtual objects may include: a virtual text object, a virtual numeric object, a virtual alpha-numeric object, a virtual tag object, a virtual field object, a virtual chart object, a virtual map object, a virtual instrumentation object, or a virtual visual representation of a physical object.

The virtual image generation system 100 comprises a frame structure 102 worn by an end user 50, a display subsystem 104 carried by the frame structure 102, such that the display subsystem 104 is positioned in front of the eyes 52 of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 104 is designed to present the eyes 52 of the end user 50 with photo-based radiation patterns that can be comfortably perceived as augmentations to physical reality, with high-levels of image quality and three-dimensional perception, as well as being capable of presenting two-dimensional content. The display subsystem 104 presents a sequence of frames at high frequency that provides the perception of a single coherent scene.

In the illustrated embodiment, the display subsystem 104 employs "optical see-through" display through which the user can directly view light from real objects via transparent (or semi-transparent) elements. The transparent element, often referred to as a "combiner," superimposes light from the display over the user's view of the real world. To this end, the display subsystem 104 comprises a projection subsystem 108 and a partially transparent display screen 110 on which the projection subsystem 108 projects images. The display screen 110 is positioned in the end user's 50 field of view between the eyes 52 of the end user 50 and an ambient environment, such that direct light from the ambient environment is transmitted through the display screen 110 to the eyes 52 of the end user 50.

In the illustrated embodiment, the projection assembly 108 provides a scanned light to the partially transparent display screen 110, thereby combining with the direct light from the ambient environment, and being transmitted from the display screen 110 to the eyes 52 of the user 50. In the illustrated embodiment, the projection subsystem 108 takes the form of an optical fiber scan-based projection device, and the display screen 110 takes the form of a waveguide-based display into which the scanned light from the projection subsystem 108 is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem 104 may be monocular or binocular.

The virtual image generation system 100 further comprises one or more sensors (not shown) mounted to the frame structure 102 for detecting the position and movement of the head 54 of the end user 50 and/or the eye position and inter-ocular distance of the end user 50. Such sensor(s) may include image capture devices (such as cameras), microphones, inertial measurement units, accelerometers, compasses, GPS units, radio devices, and/or gyros).

The virtual image generation system 100 further comprises a user orientation detection module 112. The user orientation module 112 detects the instantaneous position of the head 54 of the end user 50 and may predict the position of the head 54 of the end user 50 based on position data received from the sensor(s). Detecting the instantaneous position of the head 54 of the end user 50 facilitates determination of the specific actual object that the end user 50 is looking at, thereby providing an indication of the specific textual message to be generated for that actual object and further providing an indication of the textual region in which the textual message is to be streamed. The user orientation module 112 also tracks the eyes 52 of the end user 50 based on the tracking data received from the sensor(s).

The virtual image generation system 100 further comprises a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

The control subsystem of virtual image generation system 100 comprises a central processing unit (CPU) 114, a graphics processing unit (GPU) 116, one or more frame buffers 118, and three-dimensional data base 120 for storing three-dimensional scene data. The CPU 114 controls overall operation, while the GPU 116 renders frames (i.e., translating a three-dimensional scene into a two-dimensional image) from the three-dimensional data stored in the three-dimensional data base 120 and stores these frames in the frame buffer(s) 116. While not illustrated, one or more additional integrated circuits may control the reading into and/or reading out of frames from the frame buffer(s) 116 and operation of the projection assembly 108 of the display subsystem 104.

More significant to the present inventions, the virtual image generation system 100 further comprises a light ray angle sensing assembly 122 that directly or indirectly senses the angle of one or more light rays exiting the display screen 100 towards the eyes 52 of the end user 50. As will be described in further detail below, the desired location of each pixel of the image frame within the field of view of the end user 50 is highly correlated to the angles of the light rays exiting the display screen 110, and thus, the sensed angles of the exiting light rays may be used to calibrate the display subsystem 104 in order to ensure that the actual angles of exiting light rays are as close to identical to the designed angles of the exiting light rays encoded within the image data generated by the display subsystem 104.

Figure 4A:
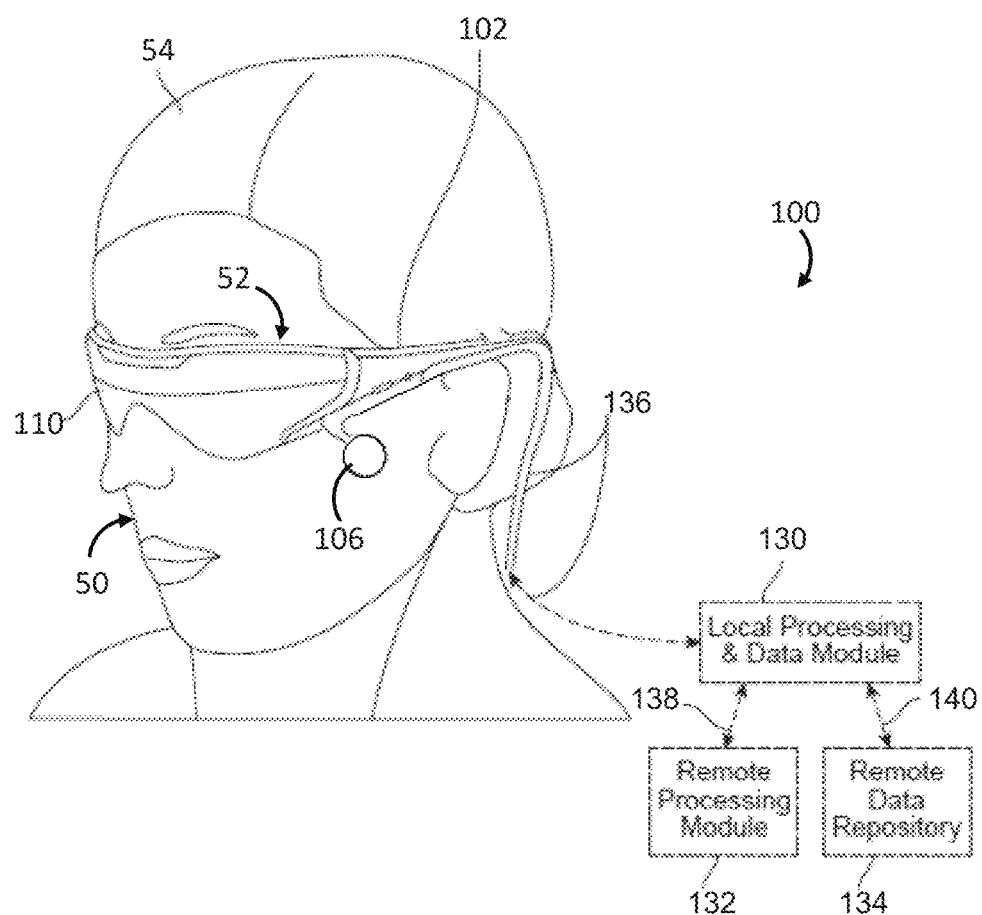
FIG. 4a is a plan view of one technique that can be used to wear the virtual image generation system of FIG. 3.
Figure 4D:
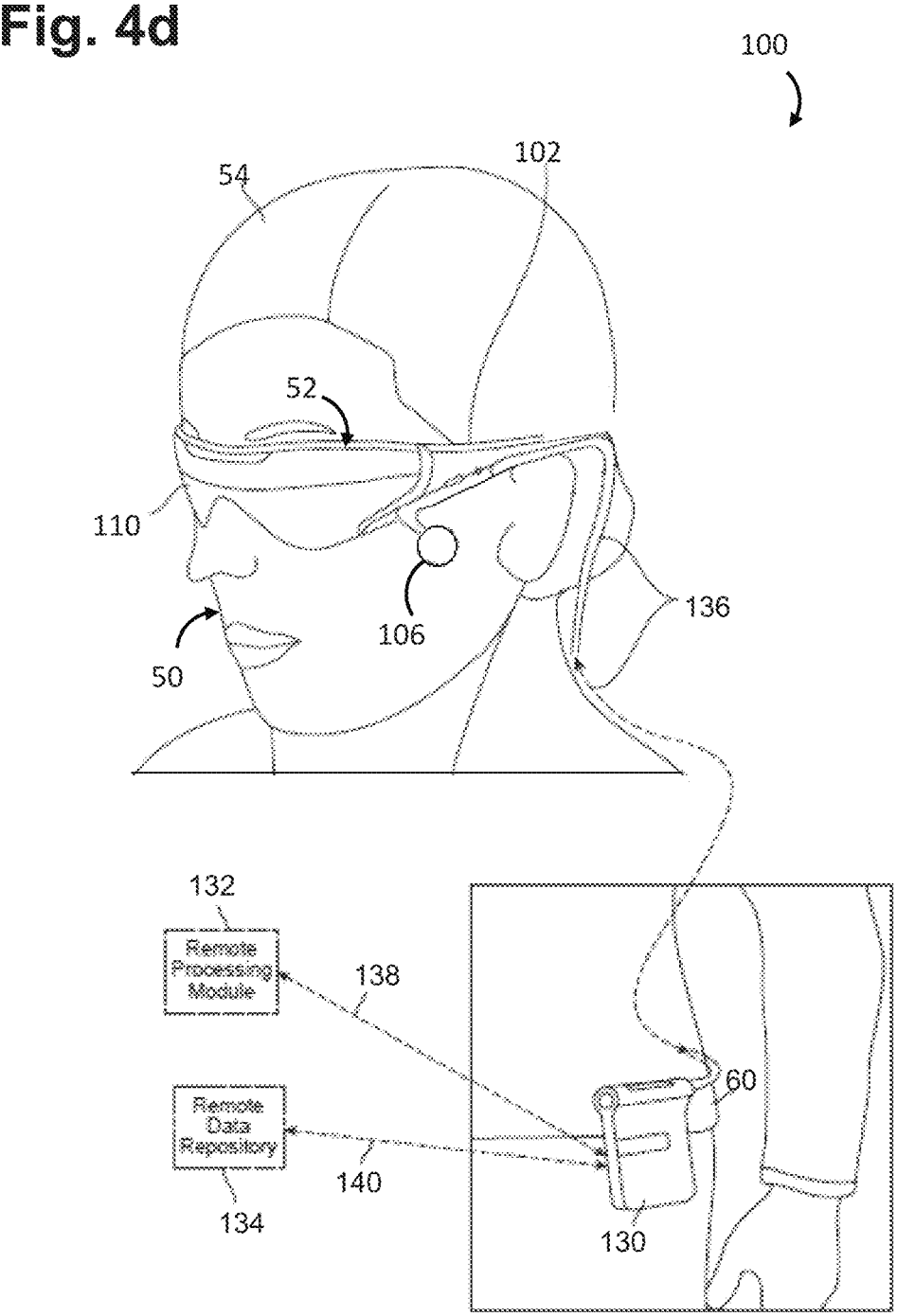
FIG. 4d is a plan view of yet another technique that can be used to wear the virtual image generation system of FIG. 3.

The various processing components of the virtual image generation system 100 may be physically contained in a distributed subsystem. For example, as illustrated in FIGS. 4a-4d, the virtual image generation system 100 comprises a local processing and data module 130 operatively coupled, such as by a wired lead or wireless connectivity 136, to the display subsystem 104 and sensors. The local processing and data module 130 may be mounted in a variety of configurations, such as fixedly attached to the frame structure 102 (FIG. 4a), fixedly attached to a helmet or hat 56 (FIG. 4b), embedded in headphones, removably attached to the torso 58 of the end user 50 (FIG. 4c), or removably attached to the hip 60 of the end user 50 in a belt-coupling style configuration (FIG. 4d). The virtual image generation system 100 further comprises a remote processing module 132 and remote data repository 134 operatively coupled, such as by a wired lead or wireless connectivity 138, 140, to the local processing and data module 130, such that these remote modules 132, 134 are operatively coupled to each other and available as resources to the local processing and data module 130.

The local processing and data module 130 may comprise a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 104 after such processing or retrieval. The remote processing module 132 may comprise one or more relatively powerful processors or controllers configured to analyze and process data and/or image information. The remote data repository 134 may comprise a relatively large-scale digital data storage facility, which may be available through the internet or other networking configuration in a "cloud" resource configuration. In one embodiment, all data is stored and all computation is performed in the local processing and data module 130, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 4a-4d. Thus, the particular choice of wired or wireless communications should not be considered limiting.

In the illustrated embodiment, the user orientation module 112 is contained in the local processing and data module 130, while CPU 114 and GPU 116 are contained in the remote processing module 132, although in alternative embodiments, the CPU 114, GPU 124, or portions thereof may be contained in the local processing and data module 130. The 3D database 120 can be associated with the remote data repository 134.

Figure 5:
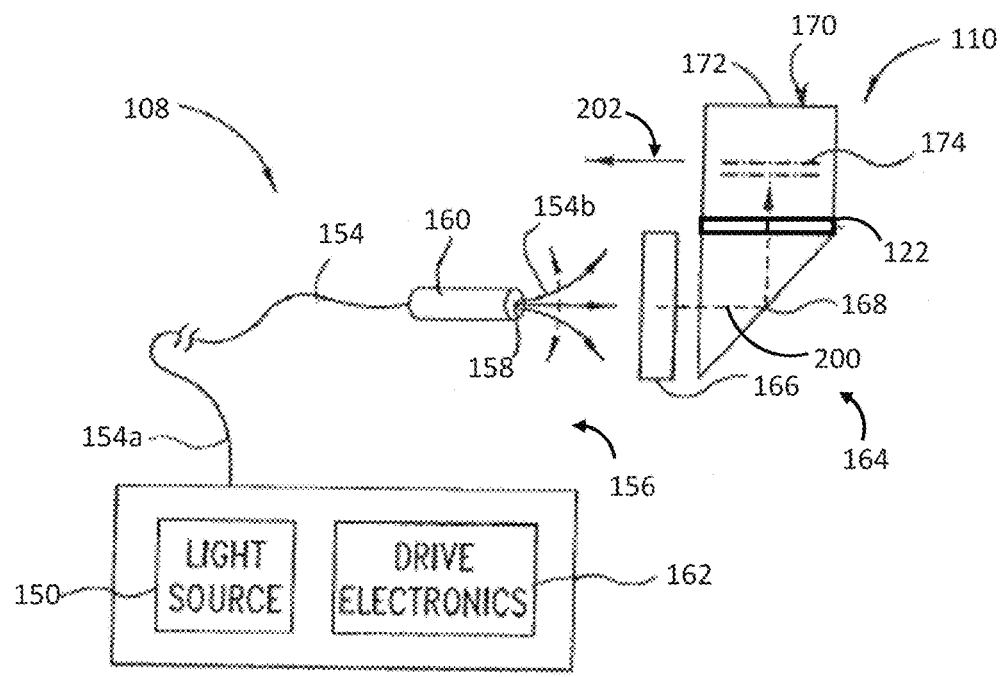
FIG. 5 is a plan view of one embodiment of a display subsystem for use in the virtual image generation system of FIG. 3.

Referring now to FIG. 5, the projection assembly 108 includes one or more light sources 150 that produces the light (e.g., emits light of different colors in defined patterns). The light source(s) 150 may take any of a large variety of forms, for instance, a set of RGB lasers (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient.

The projection assembly 108 further comprises a scanning device 152 that scans the light in a predetermined scan pattern in response to control signals. The scanning device 152 comprises one or more optical fibers 154 (e.g., single mode optical fiber), each of which has a proximal end 154a into which light is received from the light source(s) 150 and a distal end 154b from which light is provided to the display screen 110. The scanning device 152 further comprises a mechanical drive assembly 156 to which the optical fiber(s) 154 is mounted. The drive assembly 156 is configured for displacing the distal end 154b of each optical fiber 154 about a fulcrum 158 in accordance with a scan pattern.

To this end, the drive assembly 156 comprises a piezoelectric element 160 to which the optical fiber(s) 154 is mounted, and drive electronics 162 configured for conveying electrical signals to the piezoelectric element 160, thereby causing the distal end 154b of the optical fiber 154 to vibrate in accordance with the scan pattern. Thus, operation of the light source(s) 150 and drive electronics 162 are coordinated in a manner that generates image data that is encoded in the form of light that is spatially and/or temporally varying. Descriptions of optical fiber scanning techniques are provided in U.S. Patent No. 2015/0309264, which is expressly incorporated herein by reference.

The projection assembly 108 further comprises an optical coupling assembly 164 that couples the light from the scanning device 152 into the display screen 110. The optical coupling assembly 164 comprises a collimation element 166 that collimates the light emitted by the scanning device 152 into a collimated light beam 200. Although the collimation element 166 is illustrated in FIG. 5 as being physically separated from the optical fiber(s) 154, a collimation element may be physically mounted to the distal end 154b of each optical fiber 154 in a "micro-lens" arrangement, as described in U.S. patent application Ser. No. 15/286,215, entitled "Microlens Collimator for Scanning Optical Fiber in Virtual/Augmented Reality System," which is expressly incorporated herein by reference. The optical coupling subsystem 164 further comprises an in-coupling element (ICE) 168, for instance, one or more reflective surfaces, diffraction gratings, mirrors, dichroic mirrors, or prisms to optically couple light into the end of the display screen 110.

Figure 6:
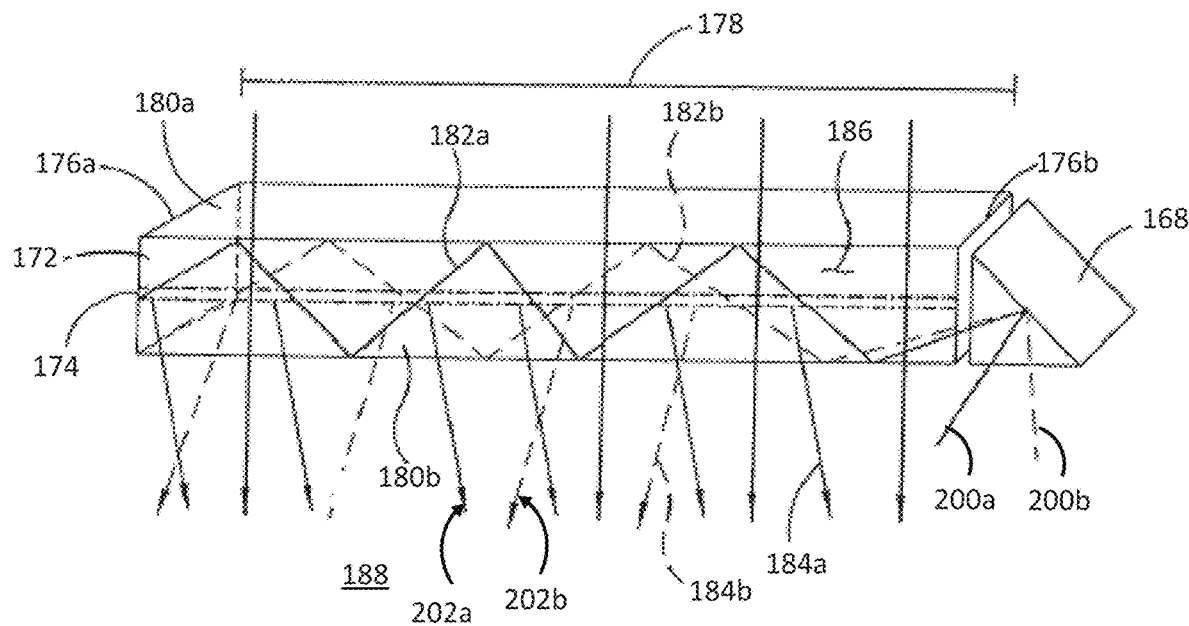
FIG. 6 is one embodiment of a planar optical waveguide for use in the display subsystem of FIG. 5.

The display screen 110 takes the form of a waveguide apparatus 170 that includes a planar optical waveguide 172 and one or more diffractive optical elements (DOEs) 174 associated with the planar optical waveguide 172. In alternative embodiments, the waveguide apparatus 170 may comprise multiple planar optical waveguides 172 and DOEs 174 respectively associated with the planar optical waveguides 172. As best illustrated in FIG. 6, the planar optical waveguide 172 has a first end 176a and a second end 176b, the second end 176b opposed to the first end 176a along a length 178 of the planar optical waveguide 172. The planar optical waveguide 172 has a first face 180a and a second face 180b, at least the first and the second faces 180a, 180b (collectively 180) forming an at least partially internally reflective optical path (illustrated by solid line arrow 182a and broken line arrow 182b, collectively 182) along at least a portion of the length 178 of the planar optical waveguide 172. The planar optical waveguide 172 may take a variety of forms that provide for substantially total internal reflection (TIR) for light striking the faces 180 at less than a defined critical angle.

The DOE(s) 174 (illustrated in FIGS. 5 and 6 by dash-dot double lines) may take a large variety of forms which interrupt the TIR optical path 182, providing a plurality of optical paths (illustrated by solid line arrows 184a and broken line arrows 184b, collectively 184) between an interior 186 and an exterior 188 of the planar optical waveguide 172 extending along at least a portion of the length 176 of the planar optical waveguide 172. In the illustrated embodiment, the DOE(s) 174 comprise one or more diffraction gratings, each of which can be characterized as an optical component with a periodic structure on the order of the light wavelength that splits and diffracts light into several beams travelling in different directions. The diffraction gratings can be composed of, e.g., surface nano-ridges, nano-patterns, slits, etc. that may be photolithographically printed on a substrate. The DOE(s) 174 may allow positioning of apparent objects and focus plane for apparent objects. Such may be achieved on a frame-by-frame, subframe-by-subframe, or even pixel-by-pixel basis.

As illustrated in FIG. 6, the light propagates along the planar optical waveguide 172 with at least some reflections or "bounces" resulting from the TIR propagation. It is noted that some implementations may employ one or more reflectors in the internal optical path, for instance thin-films, dielectric coatings, metalized coatings, etc., which may facilitate reflection. Light propagates along the length 178 of the planar optical waveguide 172, and intersects with the DOE(s) 174 at various positions along the length 178. The DOE(s) 174 may be incorporated within the planar optical waveguide 172 or abutting or adjacent one or more of the faces 180 of the planar optical waveguide 172. The DOE(s) 174 accomplishes at least two functions. The DOE(s) 174 shifts an angle of the light, causing a portion of the light to escape TIR, and emerge from the interior 216 to the exterior the face 180 of the planar optical waveguide 172. The DOE(s) 174 focuses the out-coupled light at a viewing distance. Thus, someone looking through the face 180 of the planar optical waveguides 172 can see digital imagery at one or more viewing distances.

A collimated light beam 200 entering the waveguide 172 at one of two different angles will follow one of the two TIR optical paths 182a, 182b, resulting in light rays 202 exiting the planar optical waveguide 172 along one of the two sets of external optical paths. That is, a collimated light beam 200a that enters the waveguide 172 at an angle represented by the TIR optical path 182a will result in the light rays 202a exiting the planar optical waveguide 172 along the set of external optical paths, and a collimated light beam 200b that enters the waveguide 172 at an angle represented by the TIR optical path 182b will result in the light rays 202b exiting the planar optical waveguide 172 along the set of external optical paths. As shown in FIG. 5, the light ray angle sensing assembly 122 is located between the ICE 168 and the DOE(s) 174 for directly or indirectly sensing the angle of the light rays 202 exiting the waveguide apparatus 170, although the sensing assembly 122 may be located anywhere along the optical path of the collimated light beam 200. Further details discussing the sensing assembly 122 will be described in further detail below.

In can be appreciated from the foregoing, the display subsystem 104 generates a series of synthetic image frames of pixel information that present an image of one or more virtual objects to the user. For example, referring to FIG. 7, a synthetic image frame 250 is schematically illustrated with cells 252a-252m divided into horizontal rows or lines 254a-254n. Each cell 252 of the frame 250 may specify values for each of a plurality of colors for the respective pixel to which the cell 252 corresponds and/or intensities. For instance, the frame 250 may specify one or more values for red 256a, one or more values for green 256b, and one or more values for blue 256c for each pixel. The values 256 may be specified as binary representations for each of the colors, for instance, a respective 4-bit number for each color. Each cell 252 of the frame 250 may additionally include a value 256d that specifies an amplitude.

The frame 250 may include one or more fields, collectively 258. The frame 250 may consist of a single field. Alternatively, the frame 250 may comprise two, or even more fields 258a-258b. The pixel information for a complete first field 258a of the frame 250 may be specified before the pixel information for the complete second field 258b, for example, occurring before the pixel information for the second field 258b in an array, an ordered list, or other data structure (e.g., record, linked list). A third or even a fourth field may follow the second field 258b, assuming a presentation subsystem is configured to handle more than two fields 258a-258b.

Referring now to FIG. 8, the frame 250 is generated using a raster scan pattern 260. In the raster scan pattern 260, pixels 268 (only one called out) are sequentially presented. The raster scan pattern 260 typically presents pixels 268 from left to right (indicated by arrows 262a, 262b, then from top to bottom (indicated by arrow 264). Thus, the presentation may start at the upper right corner and traverse left across a first line 266a until the end of the line is reached.

The raster scan pattern 260 typically then starts from the left in a next line down. The presentation may be temporarily blacked out or blanked when returning from the end of one line to the start of the next line. This process repeats line-by-line until the bottom line 266n is completed, for example, at the bottom right most pixel 268. With the frame 250 being complete, a new frame is started, again returning to the right of the top most line of the next frame. Again, the presentation may be blanked while returning from the bottom left to the top right to present the next frame.

Many implementations of raster scanning employ what is termed as an interlaced scan pattern. In interlaced raster scan patterns, lines from the first and the second fields 258a, 258b are interlaced. For example, when presenting lines of the first field 258a, the pixel information for the first field 258a may be used for the odd numbered lines only, while the pixel information for the second field 258b may be used for the even numbered lines only. Thus, all of the lines of the first field 258a of the frame 250 (FIG. 7) are typically presented before the lines of the second field 258b. The first field 258a may be presented using the pixel information of the first field 258a to sequentially present line 1, line 3, line 5, etc. Then the second field 258b of the frame 250 (FIG. 7) may be presented following the first field 258a, by using the pixel information of the second field 258b to sequentially present line 2, line 4, line 6, etc.

Referring to FIG. 9, a spiral scan pattern 270 may be used instead of the raster scan pattern 260 to generate the frame 250. The spiral scan pattern 270 may consist of a single spiral scan line 272, which may include one or more complete angular cycles (e.g., 360 degrees) which may be denominated as coils or loops. As with the raster scan pattern 260 illustrated in FIG. 8, the pixel information in the spiral scan pattern 270 is used to specify the color and/or intensity of each sequential pixel, as the angle increments. An amplitude or radial value 274 specifies a radial dimension from a starting point 276 of the spiral scan line 272.

Referring to FIG. 10, a Lissajous scan pattern 280 may alternatively be used to generate the frame 250. The Lissajous scan pattern 280 may consist of a single Lissajous scan line 282, which may include one or more complete angular cycles (e.g., 360 degrees), which may be denominated as coils or loops. Alternatively, the Lissajous scan pattern 280 may include two or more Lissajous scan lines 282, each phase shifted with respect to one another to nest the Lissajous scan lines 282. The pixel information is used to specify the color and/or intensity of each sequential pixel, as the angle increments. An amplitude or radial value specifies a radial dimension 284 from a starting point 286 of the Lissajous scan line 282.

Referring to FIG. 11, a multi-field spiral scan pattern 290 may alternatively be used to generate the frame 250. The multi-field spiral scan pattern 290 includes two or more distinct spiral scan lines, collectively 160, and in specifically, four spiral scan lines 292a-160d. The pixel information for each spiral scan line 292 may be specified by a respective field of a frame. Advantageously, multiple spiral scan lines 292 may be nested simply by shifting a phase between each successive ones of the spiral scan lines 292. The phase difference between spiral scan lines 292 should be a function of the total number of spiral scan lines 292 that will be employed. For example, four spiral scan lines 292a-292d may be separated by a 90-degree phase shift. An exemplary embodiment may operate at a 100 Hz refresh rate with 10 distinct spiral scan lines (i.e., subspirals). Similar to the embodiment of FIG. 9, one or more amplitude or radial values specify a radial dimension 294 from a starting point 296 of the spiral scan lines 292.

Further details describing display subsystems are provided in U.S. patent application Ser. No. 14/212,961, entitled "Display Subsystem and Method," and U.S. patent application Ser. No. 14/696,347, entitled "Planar optical waveguide Apparatus With Diffraction Element(s) and Subsystem Employing Same," which are expressly incorporated herein by reference.

Figure 12:
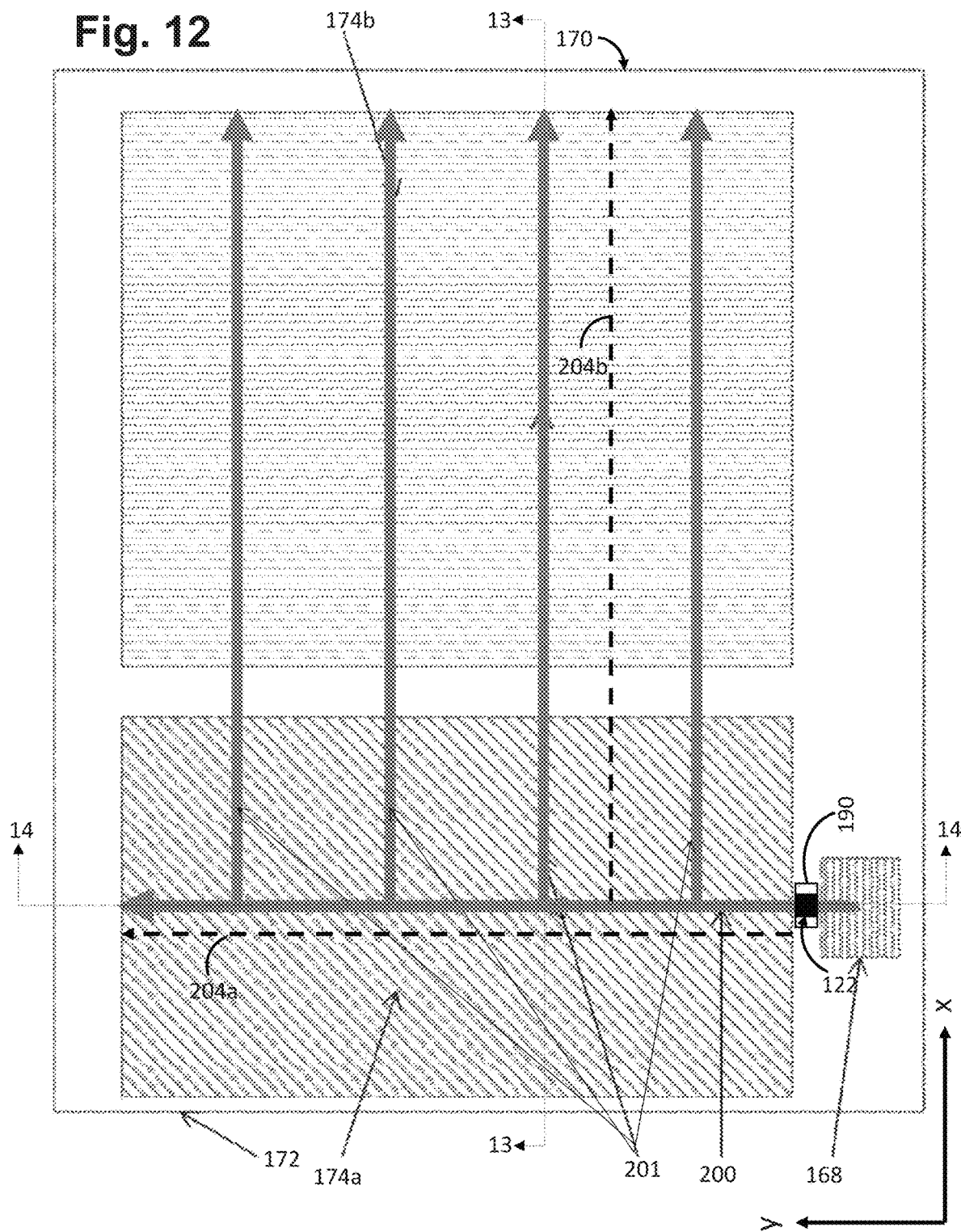
FIG. 12 is a plan view of one embodiment of a waveguide apparatus for use in the display subsystem of FIG. 5, particularly showing one arrangement of a light ray angle sensing assembly.
Figure 13:
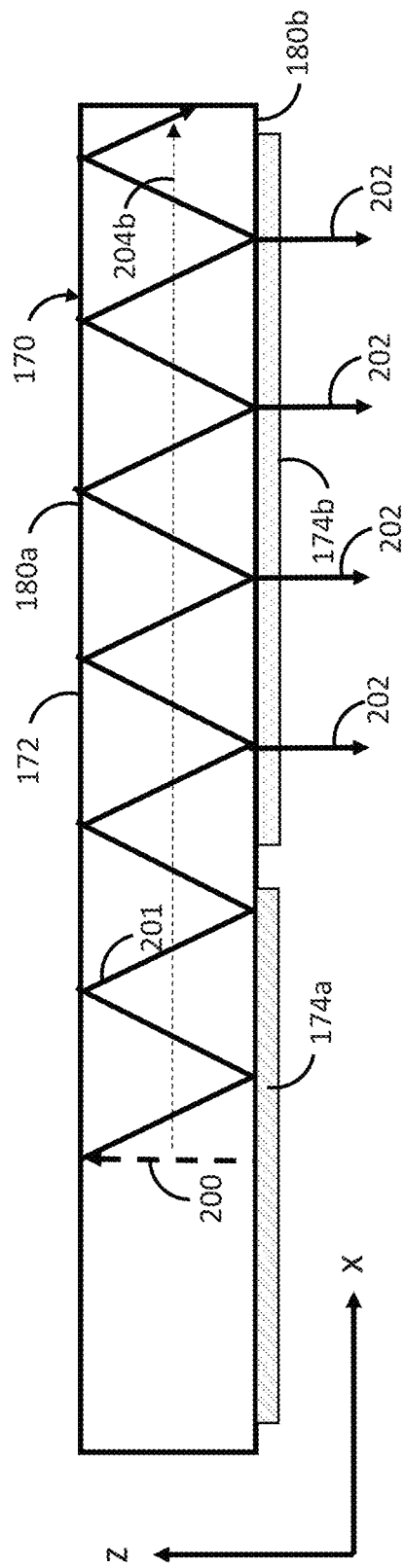
FIG. 13 is a cross-sectional view of the waveguide apparatus of FIG. 12, taken along the line 13-13.
Figure 14:
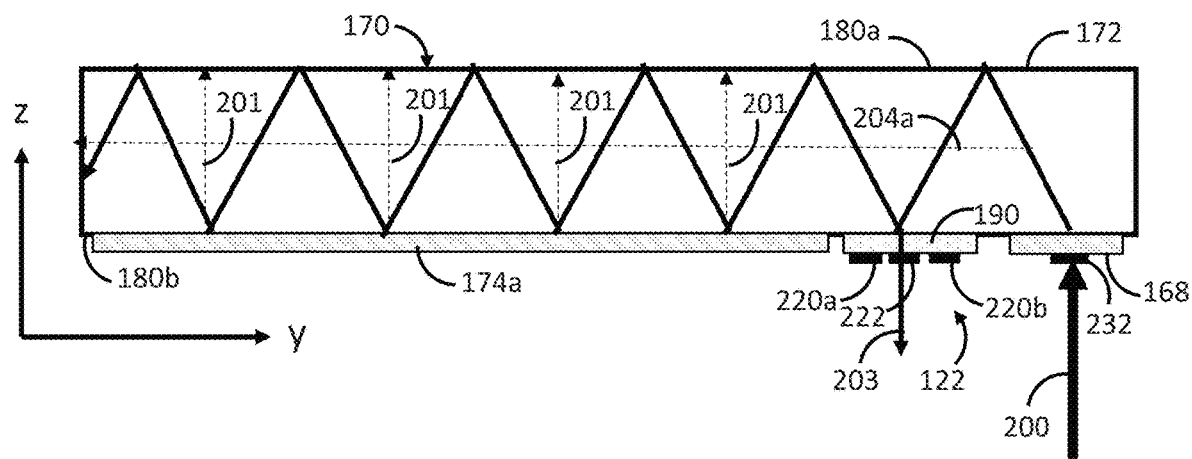
FIG. 14 is a cross-sectional view of the waveguide apparatus of FIG. 12, taken along the line 14-14.

Referring now to FIGS. 12-14, one specific embodiment of the display screen 110 and associated light ray angle sensing assembly 122 will be described. The planar optical waveguide 172 of the waveguide apparatus 170 takes the form of an optically transparent planar substrate. As shown in FIG. 12, the substrate 172 is a single unitary substrate or plane of an optically transparent material, such as, e.g., glass, fused silica, acrylic, or polycarbonate, although in alternative embodiments, the substrate 172 may be composed of separate distinct panes of optically transparent material that are bonded together in the same plane or in different planes. The ICE 168 is embedded in the face 180b of the substrate 172 for receiving the collimated light beam 200 from the projection assembly 108 into the substrate 172 via the face 180b, although in alternative embodiments, the ICE 168 may be embedded in the other face 180a or even the edge of the substrate 172 for coupling the collimated light beam 200 into the substrate 172 as an in-coupled light beam.

The DOE(s) 174 are associated with the substrate 172 (e.g., incorporated within the substrate 172 or abutting or adjacent one or more of the faces 180a, 180b of the substrate 172) for two-dimensionally expanding the effective exit pupil of the collimated light beam 200 optically coupled into the substrate 172. To this end, the DOE(s) 174 comprises one or more orthogonal pupil expansion (OPE) elements 174a (only one shown in FIG. 12) adjacent the face 180b of the substrate 172 for splitting the in-coupled light beam 200 into orthogonal light beams 201, and an exit pupil expansion (EPE) element 174b associated with the substrate 172 for splitting each orthogonal light beam 201 into the out-coupled light rays 202 that exit the face 180b of the substrate 172 towards the eye(s) 52 of the end user 50. In the alternative embodiment where the substrate 172 is composed of distinct panes, the OPE element(s) 174 and EPE element 174b may be incorporated into different panes of the substrate 172.

The OPE element 174a relays light along a first axis (horizontal or x-axis in FIG. 5), and expands the effective exit pupil of light along a second axis (vertical or y-axis in FIG. 5). In particular, the ICE 168 optically in-couples the collimated light beam 200 for propagation within the substrate 172 via TIR along an internally reflective optical path 204a (in this case, along the vertical or y-axis), and in doing so, repeatedly intersects the OPE element 174a. In the illustrated embodiment, the OPE element 174a has a relatively low diffraction efficiency (e.g., less than 50%), and comprises a series of diagonal diffractive elements (forty-five degrees relative to the x-axis), such that, at each point of intersection with the OPE element 174a, a portion (e.g., greater than 90%) of the in-coupled light beam 200 continues to propagate within the substrate 172 via TIR along the internally reflective optical path 204a, and the remaining portion (e.g., less than 10%) of the in-coupled light beam 200 is diffracted as an orthogonal light beam 201 that propagates within the substrate 172 via TIR along an internally reflective optical path 204b (in this case, along the horizontal or x-axis) toward the EPE element 174b. It should be appreciated that although the optical paths 204b are described as being perpendicular or orthogonal to the optical path 204a, the optical paths 204b may alternatively be obliquely oriented with respect to the optical path 204a. Thus, by dividing the in-coupled light beam 200 into multiple orthogonal beams 201 that propagate along parallel internally reflective optical paths 204b, the exit pupil of the collimated light beam 200 in-coupled into the waveguide apparatus 170 is expanded vertically along the y-axis by the OPE element 174a.

The EPE element 174b, in turn, further expands the light's effective exit pupil along the first axis (horizontal x-axis in FIG. 12). In particular, the EPE element 174b, like the OPE element 174a, has a relatively low diffraction efficiency (e.g., less than 50%), such that, at each point of intersection with the EPE element 174b, a portion (e.g., greater than 90%) of each orthogonal light beam 201 continues to propagate along the respective internally reflective optical path 204b, and the remaining portion of each orthogonal light beam 201 is diffracted as an out-coupled light ray 202 that exits the face 180b of the substrate 172 (along the z-axis), as illustrated in FIGS. 13 and 14. That is, every time a light beam hits the EPE element 174b, a portion of it will be diffracted toward the face 180b of the substrate 172, while the remaining portion will continue to propagate along the respective internally reflective optical path 204b.

Figure 15:
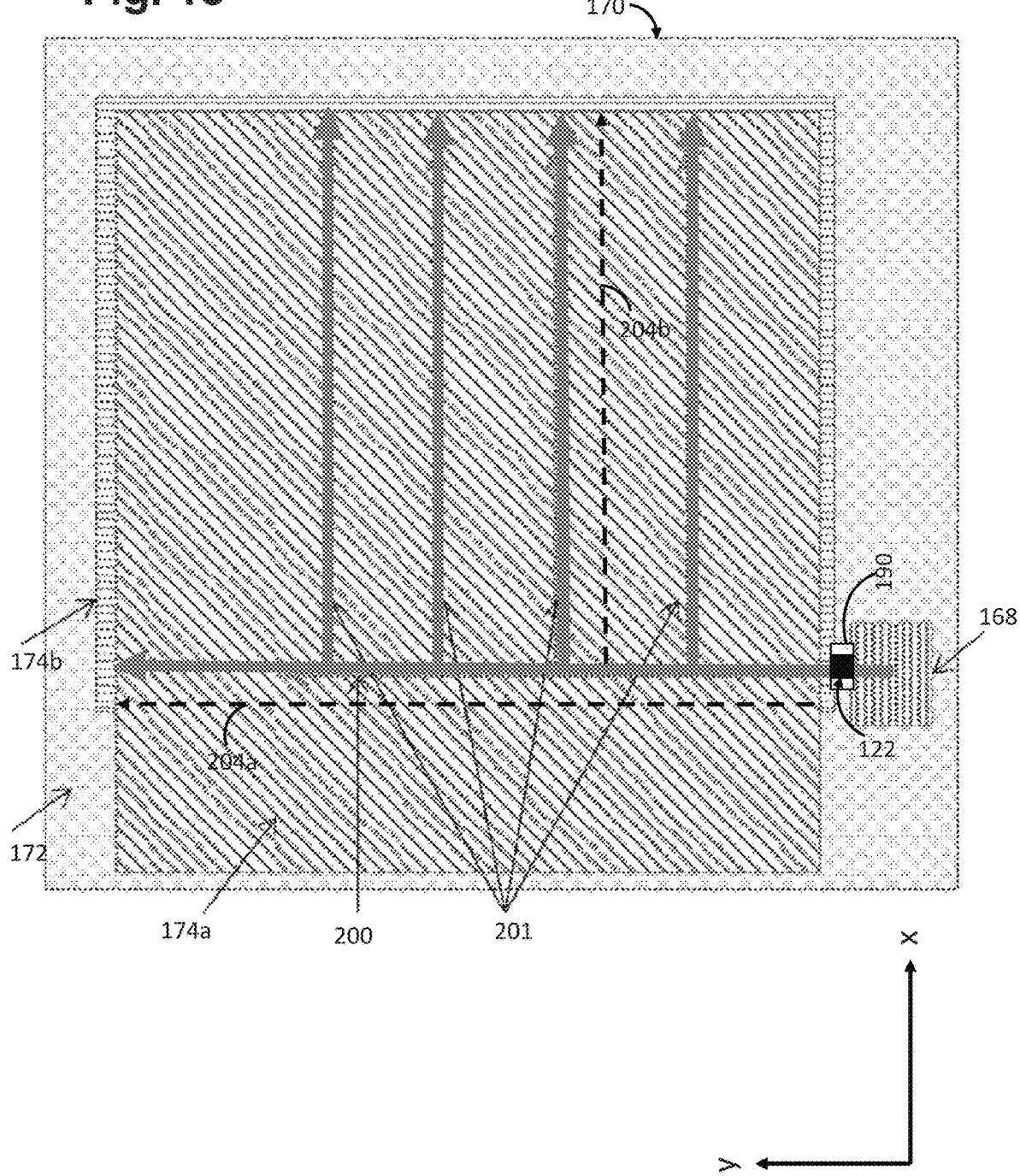
FIG. 15 is a plan view of another embodiment of a waveguide apparatus for use in the display subsystem of FIG. 5.

Thus, by dividing each orthogonal light beam 201 into multiple out-coupled light rays 202, the exit pupil of the in-coupled light beam 200 is further expanded horizontally along the x-axis by the EPE element 174b, resulting in a two-dimensional array of out-coupled light rays 202 that resemble a larger version of the original in-coupled light beam 200. It should be noted that although the OPE element 174a and EPE element 174b are illustrated in FIG. 12 as non-overlapping in the x-y plane, the OPE element 174a and EPE element 174b may fully overlap each other in the x-y plane, as illustrated in FIG. 15, or may partially overlap each other in the x-y plane, as illustrated in FIG. 16. In these cases, the OPE element 174a and EPE element 174b will need to be respectively disposed on opposite faces 180a, 180b of the substrate 172.

Figure 17A:
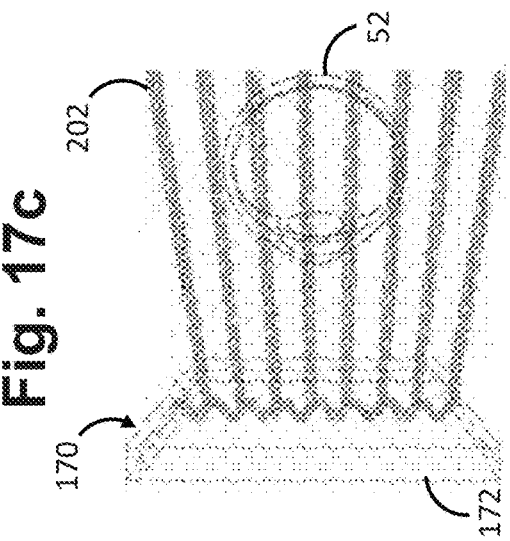
FIG. 17a is a perspective view of the waveguide apparatus of FIG. 12, particularly showing the exiting light rays focused at an infinite viewing distance.
Figure 17B:
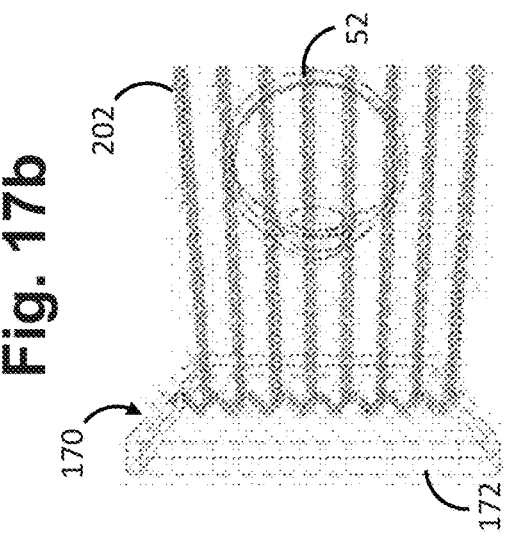
FIG. 17b is a perspective view of the waveguide apparatus of FIG. 12, particularly showing the exiting light rays focused at a first non-infinite viewing distance.
Figure 17C:
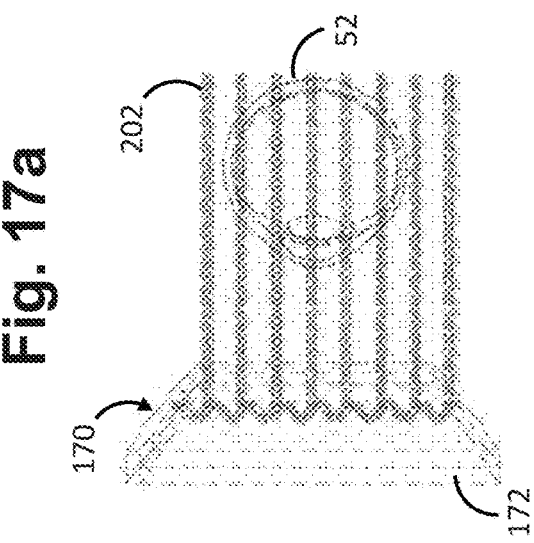
FIG. 17c is a perspective view of the waveguide apparatus of FIG. 12, particularly showing the exiting light rays focused at a second non-infinite viewing distance.

In addition to the function of out-coupling the light beamlets from the face 180b of the substrate 172, the EPE element 174b serves to focus the output set of light beam lets at along a given focal plane, such that a portion of an image or virtual object is seen by end user 50 at a viewing distance matching that focal plane. For example, if the EPE element 174b has only a linear diffraction pattern, the out-coupled light rays 202 exiting the face 180b of the substrate 172 toward the eye(s) 52 of the end user 50 will be substantially parallel, as shown in FIG. 17a, which would be interpreted by the brain of the end user 50 as light from a viewing distance (focal plane) at optical infinity. However, if the EPE element 174b has both a linear diffraction pattern component and a radially symmetric diffraction pattern component, the out-coupled light rays 202 exiting the face 180b of the substrate 172 will be rendered more divergent from the perspective of the eye(s) 52 of the end user 50 (i.e., a convex curvature will be imparted on the light wavefront), and require the eye(s) 52 to accommodate to a closer distance to bring the resulting image into focus on the retina and would be interpreted by the brain of the end user 50 as light from a viewing distance (e.g., four meters) closer to the eye(s) 52 than optical infinity, as shown in FIG. 17b. The out-coupled light rays 202 exiting the face 180b of the substrate 172 can be rendered even more divergent from the perspective of the eye(s) 52 of the end user 50 (i.e., a more convex curvature will be imparted on the light wavefront), and require the eye(s) 52 to accommodate to an even closer distance to bring the resulting image into focus on the retina and would be interpreted by the brain of the end user 50 as light from a viewing distance (e.g., 0.5 meters) closer to the eye(s) 52, as shown in FIG. 17c.

Although the waveguide apparatus 170 has been described herein as having only one focal plane, it should be appreciated that multiple planar optical waveguides 172 with associated OPEs 178 and EPEs 180 can be used to simultaneously or concurrently generate images at multiple focal planes, as discussed in U.S. Patent Publication Nos. 2015/0309264 and 2015/0346490, which are expressly incorporated herein by reference.

As briefly discussed above, the display subsystem 104 comprises a sensing assembly 122 configured for sensing at least one parameter indicative of the angle of at least one of the light rays 202 exiting the waveguide apparatus 170. In the illustrated embodiment, the sensing assembly 122 senses the parameter(s) indicative of the angle of the light ray(s) 202 relative to one or more reference planes. For example, these reference planes may comprise the x-z plane, y-z plane, and x-y plane, as described in further detail below. Notably, these reference planes may be flat, but because the exterior surface of the waveguide apparatus 170 may alternatively be curved to conform to the head 54 of the user 50, these reference planes may be curved as well.

Figure 18A:
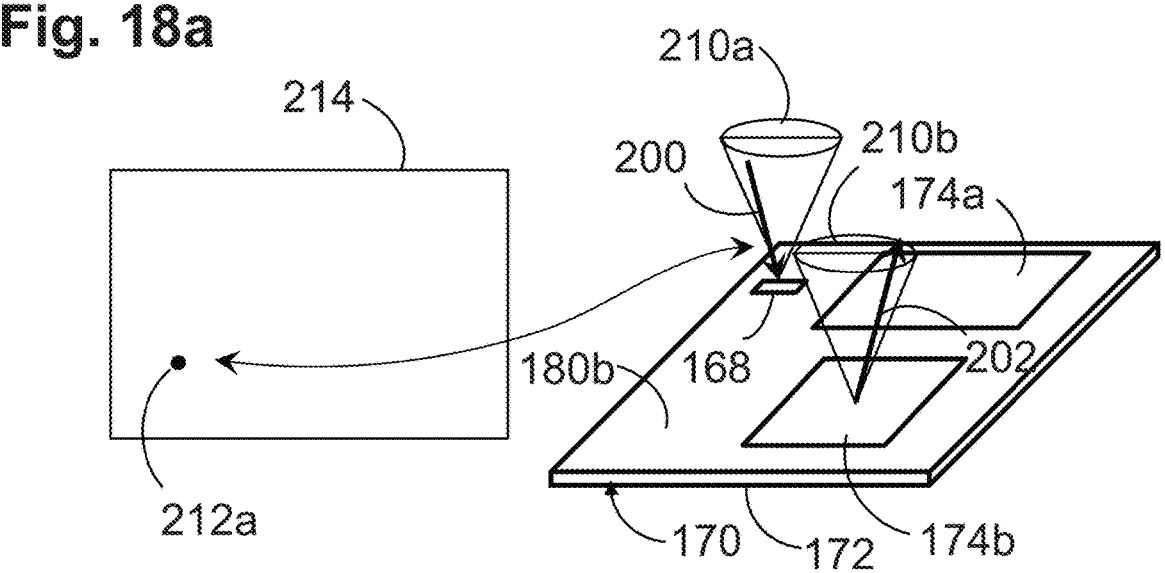
FIG. 18a is a perspective view of a display screen showing correspondence between one beam-angle of a collimated light beam and a pixel in the field of view (FOV) of the end user.
Figure 18B:
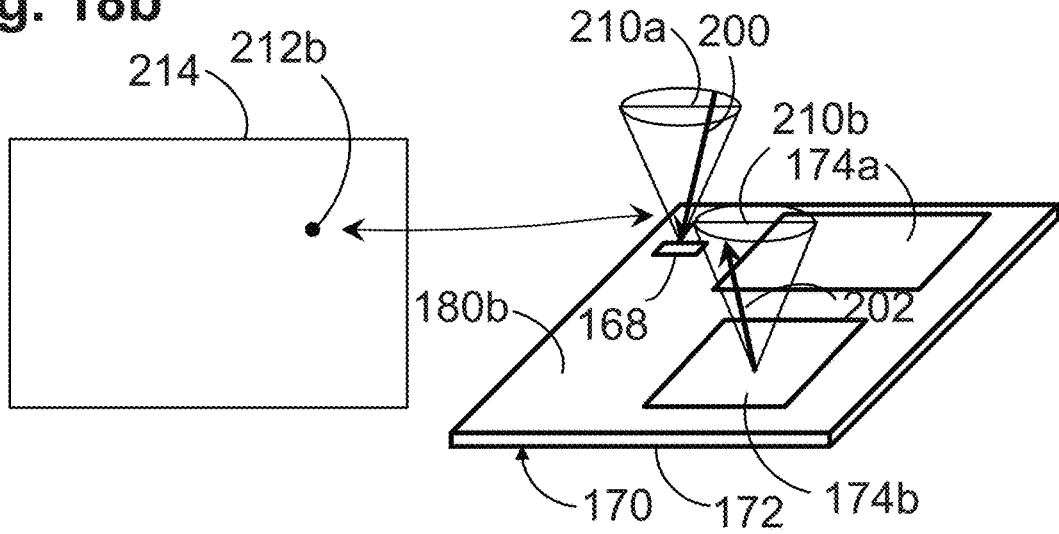
FIG. 18b is a perspective view of a display screen showing correspondence between another beam-angle of a collimated light beam and a pixel in the field of view (FOV) of the end user.

As also briefly discussed above, the angles of exiting light ray(s) are highly correlated to the positions of the pixels within the image frame. For example, as illustrated in FIGS. 18a and 18b, a collimated light beam 200 from the projection subsystem 108 enters the waveguide apparatus 170 via the ICE 168 and propagates within the planar optical waveguide 172. The exit pupil of the propagating light beam 200 is expanded along the x-axis and y-axis by the DOE(s) 174, e.g., as described above with respect to FIGS. 12-14, a light ray 202 that exits the face 180b of the planar optical waveguide 172. It should be appreciated that although only one light ray 202 in correspondence with the collimated light beam 200 input into the waveguide apparatus 170 is shown for purposes of brevity, there will typically be many light rays 202 that exit the waveguide apparatus 170 in correspondence with a single collimated light beam 200, with all angles of all of the exiting light rays 202 being related to the scan angle of the collimated light beam 200.

The collimated light beam 200 is scanned by the projection subsystem 108 to produce an input cone of light 210a, with each beam-angle in this cone corresponding to a pixel 212 in the field of view (FOV) 214 of the user. As shown in FIG. 18a, if the collimated light beam 200 has one particular beam-angle, a corresponding pixel 212a is generated in the bottom-left region of the FOV 214, whereas if the collimated light beam 200 has another particular beam-angle, a corresponding pixel 212b is generated in the top-right region of the FOV 214. The waveguide apparatus 170 presents an x-y image plane to the user by transmitting the input light cone 210a to the emission face 180b of the planar optical waveguide 172 an output cone of light 210b.

The CPU 114 (shown in FIG. 3) generates image data, which in addition to defining the colors and intensities of the pixels, defines the locations of the pixels, and thus controls the angles of the light beams 200 generated by the projection subsystem 108 relative to the display screen 110 based on the designed angles of the exiting light rays 202 corresponding to the defined locations of the pixels, as well as the actual angles of the exiting light rays 202 sensed by the sensing assembly 122, thereby ensuring that the actual angles of exiting light rays 202 are as close to identical to the designed angles of the exiting light rays 202 as possible.

For example, referring to FIG. 19, the orientation of an exiting light ray 202 from an origin in three-dimensional space may be defined by two angles, one on the x-z plane 216a and another on the y-z plane 216b, which closely correspond to the respective x- and y-coordinates of the pixel 212 in the x-y plane of the FOV 214. The CPU 114 may determine the actual angles of the exiting light ray 202 in the x-z and y-z planes 216a, 216b based on parameters sensed by the sensing assembly 122, compute a deviation between the actual angles of the exiting light ray 202 and the as-designed angles of the exiting light ray 202 for the corresponding pixel 212, and modifies the operation of the projection subsystem 108 to compensate for the discrepancy between the actual angles of the exiting light ray 202 and the as-designed angles of the exiting light ray 202.

For example, the CPU 114 may instruct the projection subsystem 108 to adjust the scan position of the collimated light beam 200. In the illustrated embodiment, the scan position of the collimated light beam 200 may be adjusted by modifying the actuation/drive profile (e.g., the drive voltages, drive signals, drive patterns, etc. provided by the drive electronics 162 to the piezoelectric element 160) of the scanning device 156 (see FIG. 5), so that the mechanical response of the scanning device 156 is more in agreement with the desired mechanical response for the desired pixel positions. As another example, the CPU 114 may modify the image data (e.g., by modifying the pixel modulation/pixel synchronization) to compensate for the known mismatch between the mechanical scan response and the desired scan response of the scanning device 156. In this case, the "incorrect angles" of the exiting light ray 202 are measured but not corrected. As still another example, a combination of modifying the scan position of the collimated light beam 200 and modifying the image data may be employed by the CPU 114.

The scan position of the collimated light beam 200 and/or the image data can be modified to compensate for the mismatch between the actual angles of the exiting light ray 202 and the desired angles of the exiting light ray 202 by employing a software/hardware controller (similar to, e.g., a proportional-integral-derivative (PID) that monitors the angle measurements in real-time, and effects the adjustment to the projection subsystem 108 as quickly as possible to minimize delay due to processing and causality. Alternatively, since the display subsystem 104 is a repetitive system, where an identical target scan pattern is used to generate each image frame, angle measurements acquired for a previous image frame can be computed and stored, and then corrections can be applied to a subsequent image frame. In the case where there is a high image frame rate, a delay on the order of a few milliseconds may be incurred.

The parameters detected by the sensing assembly 122 comprises an intensity of at least one of the light rays 202 relative to the x-z and y-z planes 216a, 216b. In the embodiment illustrated in FIGS. 12-14, the sensing assembly 122 measures the intensity of at least one light ray 203 (only one described herein) representative of the light rays 202 exiting or emitted from the waveguide apparatus 170. In this embodiment, the representative light ray 203 is different from the exiting light rays 202, and will exit the waveguide apparatus 170 at a different location from the exiting light rays 202, preferably outside of the FOV 214 of the end user 50. To this end, the waveguide apparatus 170 further comprises an additional DOE 190 for out-coupling light from the waveguide apparatus 170 as the representative light ray 203 to the sensing assembly 122, as illustrated in FIGS. 12-14.

As best shown in FIG. 14, the sensing assembly 122 comprises a pair of orthogonal angle sensors 220a and 220b (collectively, 220) configured for sensing the orthogonal components of the representative light ray 203 exiting the waveguide apparatus 170, and a normalization sensor 222 configured for sensing the absolute intensity of the representative light ray 203, such that the readings from the orthogonal angle sensors 220 can be normalized to the intensity of the light in the planar optical waveguide 172. That is, when an image is generated, the pixel intensities are modulated corresponding to the color of different pixels. Thus, the pixel intensity modulation measured by the photo-intensity sensor 222 can be taken into account when interpreting the measurements of the angle sensors 220.

In the illustrated embodiment, the angle sensors 220 and normalization sensor 222 are mounted to the planar optical waveguide 172 of the waveguide apparatus 170 in close association with the DOE 190, such that the light ray 202 passing through the DOE 190 is incident on the sensors 220, 222. The sensors 220, 222 are preferably located outside the FOV 214 of the end user 50, such that they do not interfere with the image experienced by the end user 50.

Figure 20A:
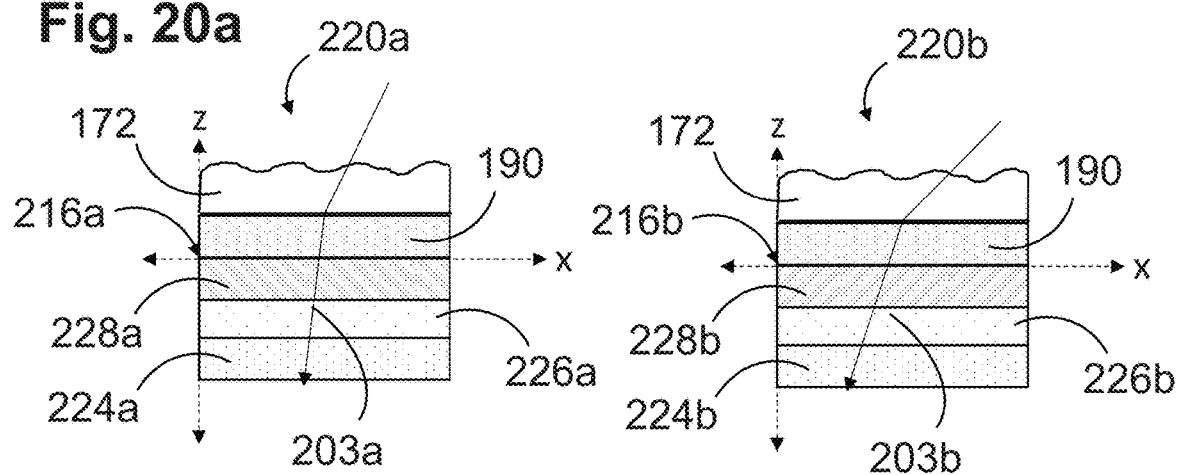
FIG. 20a is a plan view of one embodiment of orthogonal sensors of the sensing assembly of FIG. 12.

Referring further to FIG. 20a, the pair of angle sensors 220a, 220b respectively comprise a pair of photo-intensity sensors 224a, 224b (collectively, 306), a pair of angle selective dielectric layers 226a, 226b (collectively, 226), and a pair of cylindrical lenses (e.g., GRIN lenses) 228a, 228b (collectively, 228). The GRIN lenses 228 are mounted directly to the outward facing surface of the DOE 190, the dielectric layers 226 are respectively mounted directly to the outward facing surface of the GRIN lenses 228, and the photo-intensity sensors 224 are respectively mounted directly to the outward facing surface of the dielectric layers 226.

Figure 21A:
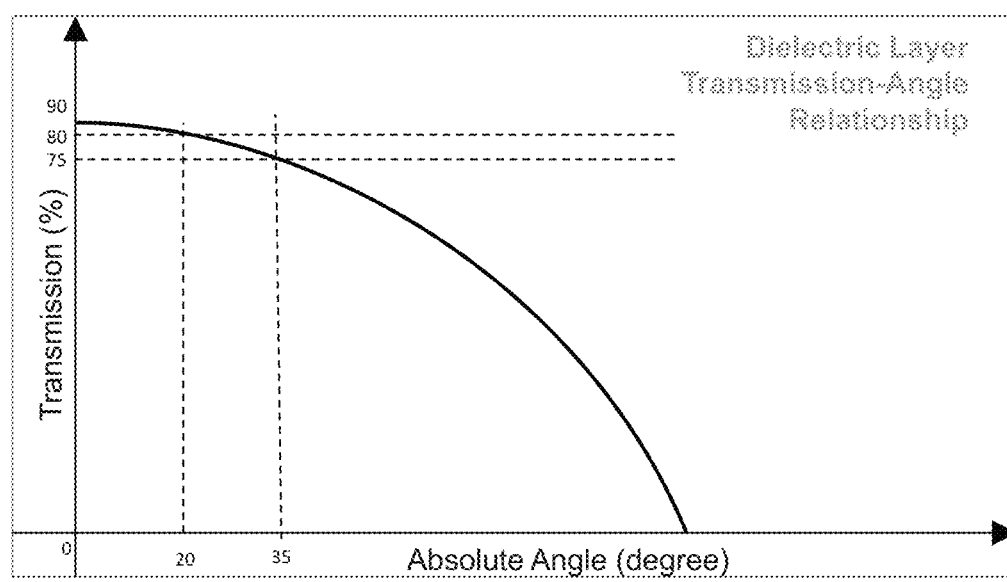
FIG. 21a is a diagram of an exemplary dielectric layer transmission-angle relationship.

Significantly, the directional properties of each dielectric layer 226 transmit light energy as a known function of the angle at which the light energy is incident on the plane of the dielectric layer 226 (which is located in the x-y plane). For example, as can be seen from an exemplary dielectric layer transmission-angle relationship illustrated in FIG. 21a, the closer the angle of the representative light ray 203 is to the normal of the plane of the dielectric layer 226 (0 degrees), the greater the energy of the representative light ray 203 is transmitted to the photo-intensity sensor 224. Furthermore, each photo-intensity sensor 224 will generate a voltage that is a known function of the intensity of light energy incident at an angle normal to the plane of the respective dielectric layer 226. For example, as can be from an exemplary photodetector intensity-voltage relationship illustrated in FIG. 21b, the higher the intensity of the light energy incident on the dielectric layer 226, the greater the voltage generated by the dielectric layer 226. As a result, the angle at which the representative light ray 203 is incident on the plane of the photo-intensity sensor 224 can be determined from these relationship curves, as will be described in further detail below. It should be noted that the relationship curves illustrated in FIGS. 21a and 21b may be generated analytically, or may be generated by measuring or calibrating the relevant values per unit, thereby resulting in more accurate and calibrated relationship curves.

Figure 21B:
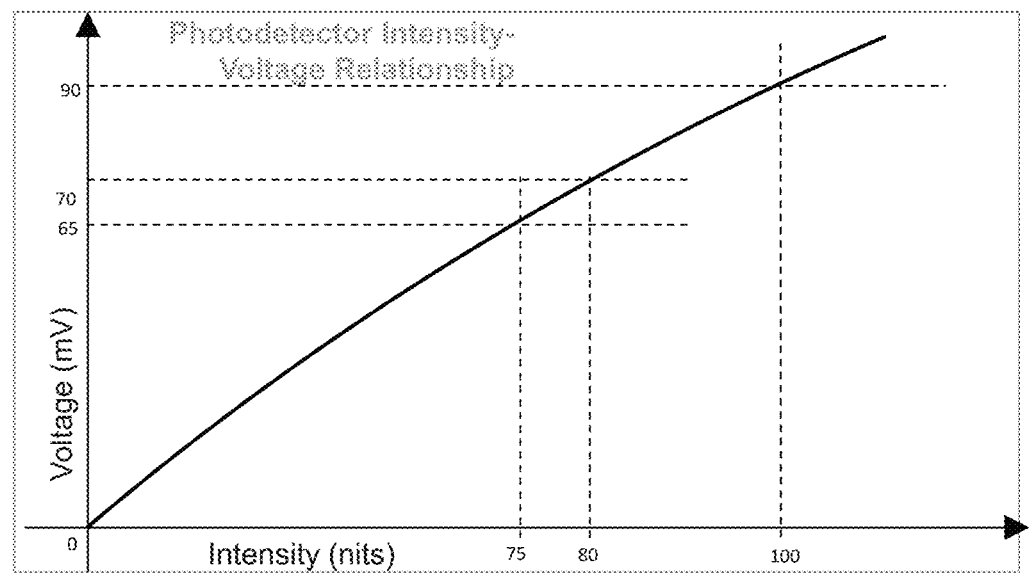
FIG. 21b is a diagram of a photodetector intensity-voltage relationship.

It should also be noted that, due to "cosine falloff," where the projection of the sensor aperture to the plane normal to the incident light decreases in area the higher the angle of incidence of the incident light, as well as the opto-physical characteristics of the light sensor, the photo-intensity sensors 224, themselves will have some degree of angular dependency, which can be utilized as a primary means of sensing the angle of the representative light ray 203, in which case, the angle sensors 220 may not include dielectric layers 226, or can be utilized as a secondary or auxiliary means of sensing the angle of the representative light ray 203 in addition to the use of the dielectric layers 226 in the angle sensors 220. In either case, a photodetector intensity-angle relationship (not shown), which correlates the voltage sensed by the respective photo-intensity sensor 224 to a range of light incident angles, may be generated. This photodetector intensity-angle relationship, by itself, can be used to determine the angle of the representative light ray 203, or may be used to confirm the angle of the representative light ray 203 determined from the dielectric layer transmission-angle relationship (FIG. 21a) and the photodetector intensity-voltage relationship (FIG. 21b).

Notably, because the dielectric layers 226 are isotropic in nature in that they will equally transmit the energy from the representative light ray 203 at the same incidence angle but different radial directions, the sensing assembly 122 breaks the circular symmetry of the dielectric layers 226, thereby allowing the orientation of the representative light ray 203 to be projected into the x-z and y-z planes 216a, 216b. To this end, the cylindrical lenses 228a, 228b are configured for respectively passing the first and second orthogonal components of the representative light ray 203 (corresponding to the x-z and y-z planes 216a, 216b) to the respective dielectric layers 226a, 226b.

Thus, one lens 228a separates the energy of the representative light ray 203a into a horizontal (x-) component, and the other lens 228b separates the energy of the representative light ray 203b into a vertical (y-) component. Thus, one photo-intensity sensor 224a will only receive the horizontal energy component of the representative light ray 203a exiting the DOE 190, and the other photo-intensity sensor 224b will only receive the vertical energy component of the representative light ray 203b via the DOE 190. The angle of the representative light ray 202 projected onto the x-z and y-z planes 216a, 216b can then be determined from these horizontal and vertical components of the representative light ray 203, as will be discussed below.

Notably, although each angle sensor 220 is described as detecting one representative light ray 203 for purposes of brevity and clarity in illustration, each of the angle sensors 220, in reality, detects many light rays, and therefore, the voltage outputs of angle sensors 220 will be representative of the composite of the horizontal component 203a or vertical component 203b of the representative light ray 203. However, the DOE 190 preferably has a linear diffraction pattern, such that the angles of the representative light ray 203 exiting the DOE 190 are uniform given a specific angle of the in-coupled collimated beam 200.

Figure 20B:
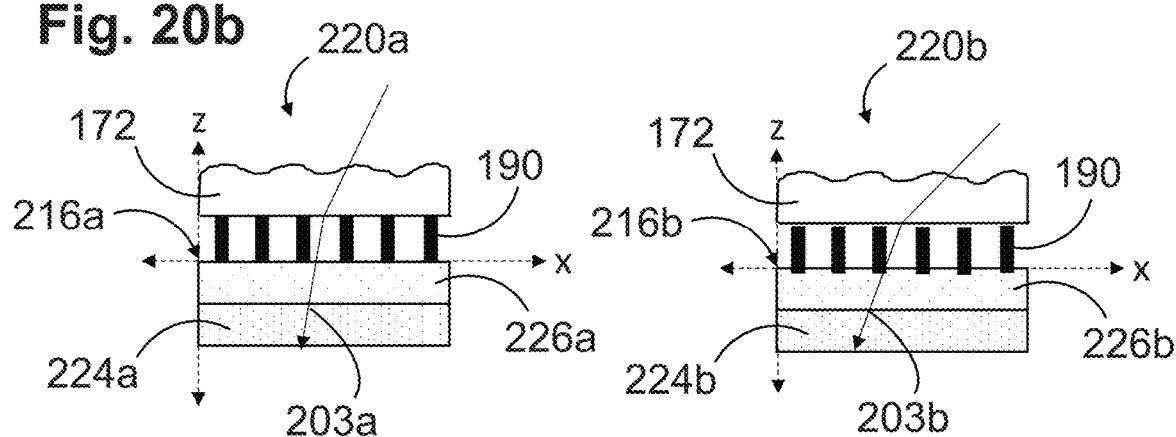
FIG. 20b is a plan view of another embodiment of orthogonal sensors of the sensing assembly of FIG. 12.
Figure 20C:
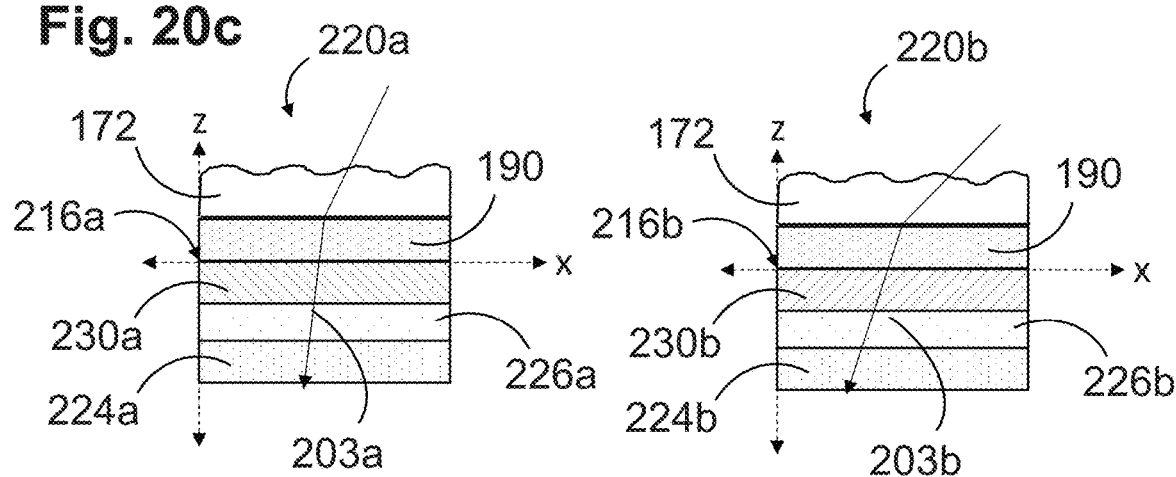
FIG. 20c is a plan view of still another embodiment of orthogonal sensors of the sensing assembly of FIG. 12.

In an alternative embodiment illustrated in FIG. 20b, rather than using cylindrical lenses 310 in association with the already existing DOE 190, the DOE 190, itself, may be segmented into a portion that passes one orthogonal component to the angle sensor 220a and another portion that passes the other orthogonal component to the angle sensor 220b in the same manner that as the cylindrical lenses 228 described above. In still another alternative embodiment illustrated in FIG. 20c, the angle sensors 220 respectively comprise a pair of polarization elements 230a, 230b (collectively, 230) configured for polarizing the representative light ray 203 into orthogonally polarized light rays, which are then passed to the respective photo-intensity sensors 224a, 224b via the dielectric layers 226a, 226b.

In yet another alternative embodiment, instead of cylindrical lenses or any of the other devices described above, the dielectric layers 226a, 226b, themselves, can be strained in orthogonal orientations, such that the dielectric layers 226 are no longer isotropic, but rather are anisotropic, and tend to pass the representative light ray 203 in one orthogonal direction more than in the other orthogonal direction, and vice versa. Although the anisotropic dielectric layers 226 do not perfectly transmit the representative light ray 203 in orthogonal manners, the angle of the representative light ray 203, when projected onto the x-z and y-z planes 216a, 216b, can still be determined in view of the known orthogonal transmission coefficient of the dielectric layers 226 (i.e., the ratio of light energy transmitted by each dielectric layer 226 in one orthogonal direction relative to the other orthogonal direction).

Although each of the angle sensors 220 is described as being closely associated with the DOE 190, it should be appreciated that one or both of the angle sensors 220 can be mounted in the waveguide apparatus 170 at any interface that takes the form of a grating or material with a different refractive index than the material of which the planar optical waveguides 172 are composed, thereby allowing the light rays to escape and enter the sensors 220. However, the angle of the representative light ray 203 exiting the DOE 190 will closely match the nominal angle of the light rays 202 exiting the EPE element 174b for any given scan angle of the in-coupled collimated beam 200.

Notwithstanding the foregoing, the angle sensors 220 may alternatively be closely associated with the EPE element 174b. In this case, the light rays 202 exiting the waveguide apparatus 170 will comprise the representative light ray sensed by the angle sensors 220. In this case, the light rays 202 sensed by the angle sensors 220 may be divergent, and thus somewhat non-uniform, given any particular angle of the in-coupled collimated beam 200, since the EPE element 174b may have a radially symmetric diffraction pattern that creates a focal plane that is not at optical-infinity. In this case, the size of the angle sensors 220 will preferably be relatively small, and as such, the angle variance between the light rays impinging on an angle sensor 220 will be insignificant.

By the same token, if the angle sensors 220 are closely associated with the EPE element 174b, it is desired that the spacing between respective angle sensors 220 be relatively small, such that the horizontal and vertical light components of the exiting light ray 202 detected by the angle sensors 220a, 220b will essentially serve as the components of a nominal light ray exiting the waveguide apparatus 170. In the end, the function of the angles of the light rays 202a, 202b projected onto the x-z and y-z planes 216a, 216b will essentially be close to the average of the angles of all the light rays 202 impinging on the angle sensors 220, which due to the small variance between the angles, is representative of a nominal angle of the light rays 202 exiting the waveguide apparatus 170. In an alternative embodiment, the angle sensors 220 may be placed on the waveguide 302 that produces images at optical infinity (i.e., no lensing) or a special area on the waveguide apparatus 170 without lensing, whereby the angles of the light rays are parallel to each other.

Notably, the angle sensors 220, as disclosed, are only capable of sensing information from which an absolute angle of the exiting light rays 202 in the x-z plane 216a or y-z plane 216b can be obtained (e.g., an absolute angle of 30° may be +30° or −30°). Thus, the sensing assembly 122 senses another parameter indicative of the relative angle of the exiting light rays 202 in the x-z plane 216a or y-z plane 216b. In the illustrated embodiment, this sensed parameter comprises a quadrant in which the collimated light beam 200 is projected in a plane, so that the sign of the angles of the light rays 202 projected onto the x-z and y-z planes 216a, 216b can be determined.

Figure 22A:
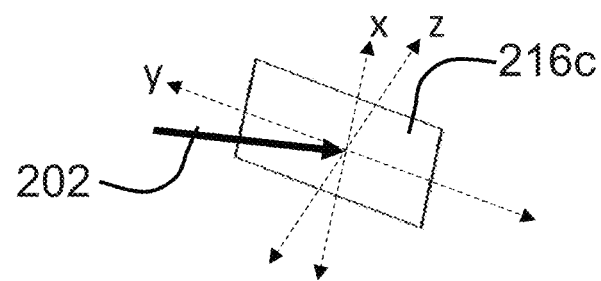
FIG. 22a is a perspective view of a diagram illustrating a light ray exiting the planar optical waveguide apparatus relative to an x-y plane.
Figure 22B:
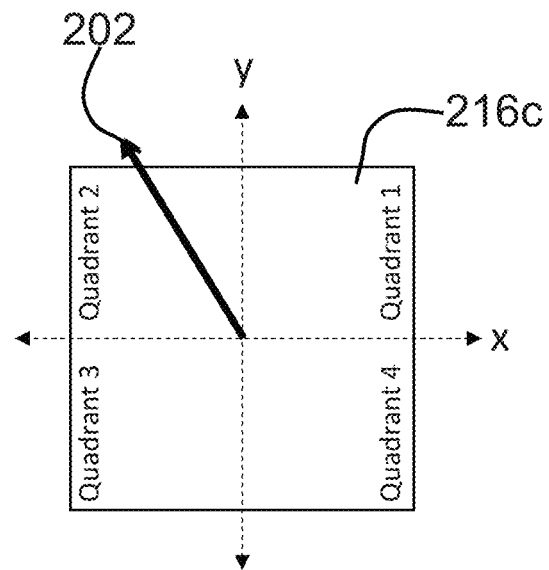
FIG. 22b is a plan view of a diagram illustrating the light ray of FIG. 23a projected onto the x-y plane.

For example, as illustrated in FIG. 22a, one exiting light ray 202 forms an angle relative to the x-y plane 216c. That is, when projected onto the x-y plane 216c, the exiting light ray 202 may form an angle in the x-y plane 216c, as illustrated in FIG. 22b. As there shown, the angle of the exiting light ray 202 projected within second quadrant of the x-y plane 216c, and therefore, it can be determined that the angle that the exiting light ray 202 makes in the x-z plane 216a has a negative sign, and the angle that the exiting light ray 202 makes in the y-z plane 216b should have a positive sign.

Figure 23A:
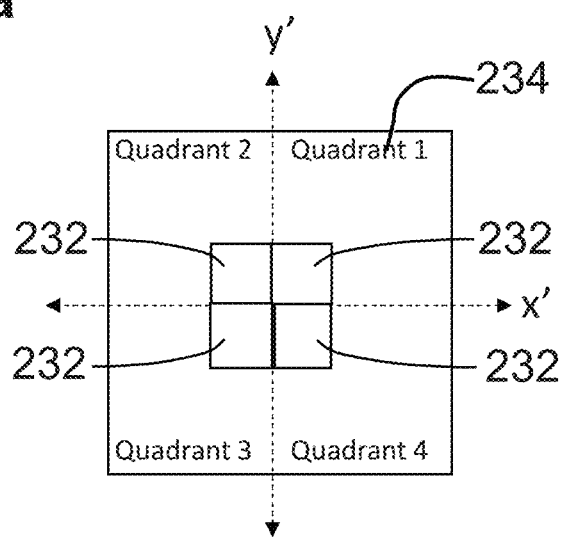
FIG. 23a is a plan view of one embodiment of four quadrant sensors of the sensing assembly of FIG. 12.
Figure 23B:
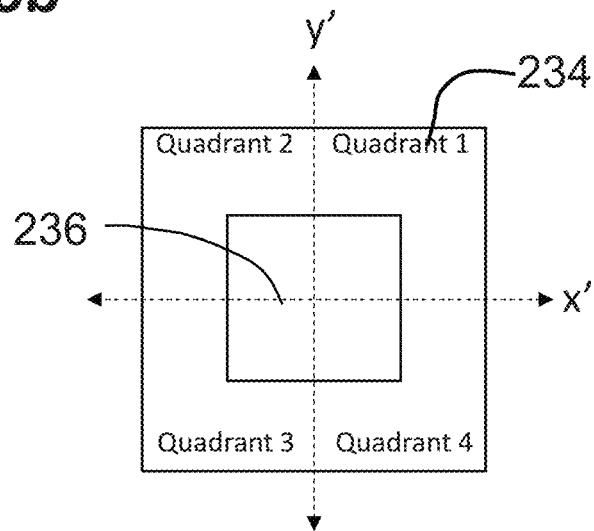
FIG. 23b is a plan view of one embodiment of a position sensing detector (PSD) of the sensing assembly of FIG. 12.
Figure 24:
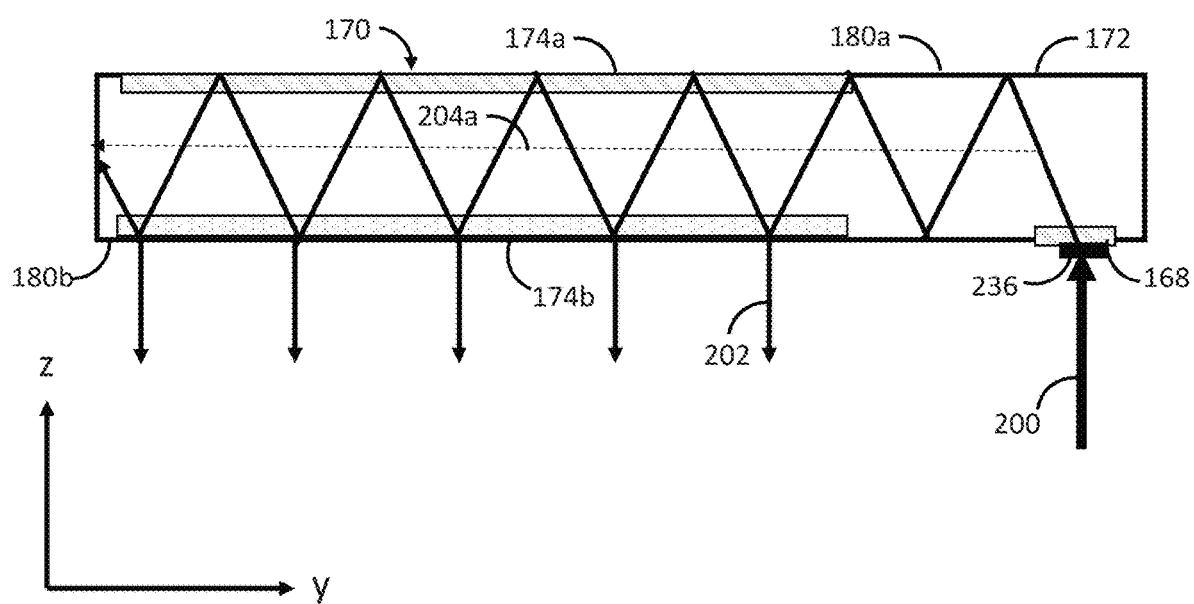
FIG. 24 is a profile view of one embodiment of a waveguide apparatus for use in the display subsystem of FIG. 5, particularly showing another arrangement of a light ray angle sensing assembly.

The sensing assembly 122 is configured for indirectly detecting the quadrant in which the exiting light ray 202 is projected by detecting a quadrant that the collimated light beam 200 that enters the ICE 168 from the collimation element 274 is pointed (shown in FIG. 5). In particular, referring back to FIGS. 13 and 14, the sensing assembly 122 comprises one or more quadrant sensors 232 mounted to ICE 168. As illustrated in FIG. 23a, four quadrant sensors 232 are spaced apart in quadrants of a reference plane 234, such that activation of one of the sensors 232 by the collimated light beam 200 will indicate the quadrant at which the light beam 200 is currently pointed. Alternatively, as illustrated in FIG. 23b, the sensing assembly 122 may comprise a quadrant position sensing detector (PSD) 236 centered at the intersection of the quadrants. In any event, because the angular position of the collimated light beam 200 is correlatable to the angle of the light rays 202 exiting the waveguide apparatus 170, the quadrant in which the light rays 202 are projected into the x-y plane 216c can be derived from the quadrant of the reference plane 234 at which the collimated light beam 200 is pointed.

In an alternative embodiment, the quadrant in which the light rays 202 are projected into the x-y plane 216c can simply be inferred from the quadrant of the current scan position in the scan pattern when the intensity of the exiting light rays 202 is sensed by the sensing assembly 122.

Although sensors that detect the angle of the exiting light rays 202 have been described as being closely associated with the planar optical waveguides 200, one or more angle detecting sensors can be incorporated into any portion of the display subsystem 104 where a light ray or beam correlatable to the angles of the light rays exiting the waveguide apparatus 170 can be detected. For example, a PSD 236 that detects both an angle of collimated light beam 200 projected on the x-z and y-z planes 216a, 216b, as well as the quadrant of the x-y plane 216c in which the collimated light beam 200 is projected, can be mounted to the ICE 168, as illustrated in FIG. 25.

The PSD 236 directly senses the angle of the collimated beam 200, rather than the light rays 202 exiting the waveguide apparatus 170. However, because the angle of the collimated beam 200 is highly correlatable to the angles of the light rays 202 exiting the waveguide apparatus 170, the PSD 236 indirectly senses the angles of the light rays 202 exiting the waveguide apparatus 170 by virtue of directly sensing the angle of the collimated beam 200.

One method of determining the angles of a light ray 202 projected onto the x-z plane 216a and y-z plane 216b will now be described. Assume that the photo-intensity sensor 222 measures a voltage of 90 mV. In accordance with the exemplary photodetector intensity-voltage relationship illustrated in FIG. 22b, the absolute intensity of the representative light ray 203 can then be determined to be 100 nits.

Assume that the angle sensor 220a measures a voltage of 70 mV. In accordance with the exemplary photodetector intensity-voltage relationship illustrated in FIG. 21b, the intensity of the representative light ray 203 transmitted by the angle selective dielectric layer 226a to the photo-intensity sensor 224a can then be determined to be 80 nits. Thus, based on the known intensity of the light ray of 100 nits, it can be determined that the dielectric layer 226a transmits 80/100=80% of the light energy to the photo-intensity sensor 224a. In accordance with the exemplary dielectric layer transmission-angle relationship illustrated in FIG. 21a, the absolute angle of the representative light ray 203 projected in the x-z plane 216a can then be determined to be 20 degrees.

Similarly, assume the angle sensor 220b measures a voltage of 65 mV. In accordance with the exemplary photodetector intensity-voltage relationship illustrated in FIG. 21b, the intensity of the representative light ray 203 transmitted by the angle selective dielectric layer 226b to the photo-intensity sensor 224b can then be determined to be 75 nits. Thus, based on the known intensity of the light ray of 100 nits, it can be determined that the dielectric layer 226b transmits 75/100=75% of the light energy to the photo-intensity sensor 224b. In accordance with the exemplary dielectric layer transmission-angle relationship illustrated in FIG. 21a, the absolute angle of the representative light ray 203 projected in the y-z plane 216a can then be determined to be 35 degrees.

If the sensors 232 or PSD 236 detect that the angle of the representative light ray 203 projected on the x-y plane 216c is in the third quadrant, or it is otherwise known that the angle of the representative light ray 203 projected on the x-y plane 216c is in the third quadrant derived from information of the known scan angle of the collimated beam 200, it can be determined that the angles of the representative light ray 203 respectively projected into the x-z plane 216a and y-z plane 216b should both be negative, and thus, be −20 degrees and −35 degrees.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. Thus, the present inventions are intended to cover alternatives, modifications, and equivalents, which may be included within the spirit and scope of the present inventions as defined by the claims.

What is claimed is:

1. A display subsystem for a virtual image generation system used by an end user, comprising:
 a waveguide apparatus;
 an imaging element configured for emitting light into the waveguide apparatus, such that a plurality of light rays exit the waveguide apparatus; and
 a sensing assembly configured for sensing at least one parameter indicative of an angle of the plurality of light rays, wherein the at least one sensed parameter comprises an intensity of at least one light ray representative of the plurality of light rays.

2. The display subsystem of claim 1, wherein the imaging element comprises:
 at least one light source configured for generating the light;

an optical fiber configured for emitting the light; and
a mechanical drive assembly to which the optical fiber is mounted, the mechanical drive assembly configured for displacing the optical fiber in accordance with a scan pattern.

3. The display subsystem of claim 2, wherein the mechanical drive assembly comprises a piezoelectric element to which the optical fiber is mounted, and drive electronics configured for conveying electrical signals to the piezoelectric element, thereby causing the optical fiber to vibrate in accordance with the scan pattern.

4. The display subsystem of claim 1, wherein the waveguide apparatus has a partially transparent display surface configured for being positioned in the field of view between the eyes of the end user and an ambient environment.

5. The display subsystem of claim 1, wherein the waveguide apparatus comprises:
a planar optical waveguide;
an in-coupling element (ICE) configured for optically coupling the light from the imaging element into the planar optical waveguide as an in-coupled light beam;
an orthogonal pupil expansion (OPE) element associated with the planar optical waveguide for splitting the in-coupled light beam into a plurality of orthogonal light beams; and
an exit pupil expansion (EPE) element associated with the planar optical waveguide for splitting the plurality of orthogonal light beams into the light rays that exit the planar optical waveguide.

6. The display subsystem of claim 5, wherein the planar optical waveguide comprises a single substrate formed of a single pane of optically transparent material.

7. The display subsystem of claim 1, wherein the at least one sensed parameter is indicative of exiting light ray angles projected in at least one plane that is orthogonal to a plane that coincides with the exterior surface of the waveguide apparatus.

8. The display subsystem of claim 1, wherein the at least one representative light ray is different from the plurality of exiting light rays.

9. The display subsystem of claim 8, wherein the at least one representative light ray exits the waveguide apparatus at a different location from the plurality of exiting light rays outside of a field of view of the end user.

10. The display subsystem of claim 1, wherein the sensing assembly comprises at least one angle sensor, each of which includes a photo-intensity sensor and an angle selective layer mounted between the waveguide apparatus and the photo-intensity sensor.

11. The display subsystem of claim 10, wherein the at least one angle sensor comprises a pair of orthogonal sensors respectively configured for sensing first and second orthogonal intensity components of the at least one representative light ray.

12. The display subsystem of claim 11, wherein the pair of orthogonal sensors respectively comprises first and second cylindrical lenses configured for respectively passing the first and second orthogonal intensity components of the at least one representative light ray.

13. The display subsystem of claim 11, wherein the pair of orthogonal sensors respectively comprises first and second diffractive optical elements configured for respectively passing the first and second orthogonal intensity components of the at least one representative light ray.

14. The display subsystem of claim 11, wherein the pair of orthogonal sensors respectively comprises first and second polarization elements configured for respectively polarizing each of the at least one representative light ray into orthogonally polarized light rays.

15. The display subsystem of claim 11, wherein the angle selective layers are strained in orthogonal orientations.

16. The display subsystem of claim 11, wherein the at least one sensed parameter comprises an absolute intensity of the at least one representative light ray, such that the first and second orthogonal intensity components can be normalized.

17. The display of subsystem of claim 16, wherein the sensing assembly comprises another photo-intensity sensor configured for measuring the absolute intensity of the at least one representative light ray.

18. The display subsystem of claim 11, wherein the at least one sensed parameter is indicative of relative angles of the plurality of exiting light rays.

19. The display subsystem of claim 18, wherein the at least one sensed parameter further comprises a quadrant in which the light is projected in a plane.

20. The display subsystem of claim 19, wherein the sensing assembly comprises a plurality of sensors spaced apart in the quadrants of a reference plane or a quadrant position sensing detector (PSD).

* * * * *